(12) United States Patent
Yasuda

(10) Patent No.: US 11,184,608 B2
(45) Date of Patent: Nov. 23, 2021

(54) IMAGE PROCESSING APPARATUS AND METHOD

(71) Applicant: SONY CORPORATION, Tokyo (JP)

(72) Inventor: Hiroyuki Yasuda, Saitama (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/770,300

(22) PCT Filed: Dec. 4, 2018

(86) PCT No.: PCT/JP2018/044461
§ 371 (c)(1),
(2) Date: Jun. 5, 2020

(87) PCT Pub. No.: WO2019/124042
PCT Pub. Date: Jun. 27, 2019

(65) Prior Publication Data
US 2021/0176463 A1 Jun. 10, 2021

(30) Foreign Application Priority Data
Dec. 18, 2017 (JP) .............................. JP2017-241479

(51) Int. Cl.
*H04N 19/00* (2014.01)
*H04N 19/107* (2014.01)
(Continued)

(52) U.S. Cl.
CPC ......... *H04N 19/107* (2014.11); *H04N 19/147* (2014.11); *H04N 19/159* (2014.11); *H04N 19/176* (2014.11)

(58) Field of Classification Search
CPC ...................................................... H04N 19/00
See application file for complete search history.

(56) References Cited

U.S. PATENT DOCUMENTS

| 2010/0189184 A1 | 7/2010 | Yamaguchi et al. |
| 2011/0235929 A1* | 9/2011 | Mizosoe .............. H04N 19/107 |
| | | 382/236 |

(Continued)

FOREIGN PATENT DOCUMENTS

| CN | 102202219 A | 9/2011 |
| JP | 2011-205465 A | 10/2011 |

(Continued)

OTHER PUBLICATIONS

International Search Report and Written Opinion of PCT Application No. PCT/JP2018/044461, dated Feb. 12, 2019, 09 pages of ISRWO.

*Primary Examiner* — Maryam A Nasri
(74) *Attorney, Agent, or Firm* — Chip Law Group

(57) ABSTRACT

The present disclosure relates to an image processing apparatus and a method designed to maintain subjective image quality. An intra prediction unit and a motion compensation unit calculate the costs of the modes of the respective blocks constituting the current frame. An intra refresh determination unit selects modes of the respective blocks, on the basis of the calculated costs and refreshed blocks that are the blocks refreshed in the previous frame that is located before the current frame timewise. The present disclosure can be applied to an image processing apparatus, an image encoding device, an image decoding device, or the like, for example.

10 Claims, 28 Drawing Sheets

(51) Int. Cl.
*H04N 19/147* (2014.01)
*H04N 19/159* (2014.01)
*H04N 19/176* (2014.01)

(56) References Cited

U.S. PATENT DOCUMENTS

2014/0294072 A1* 10/2014 Elkhazin ............. H04N 19/172
 375/240.12
2015/0154725 A1 6/2015 Kuraki et al.

FOREIGN PATENT DOCUMENTS

| JP | 2013-165340 A | 8/2013 |
| JP | 2015-106848 A | 6/2015 |
| WO | 2009/044475 A1 | 4/2009 |

* cited by examiner

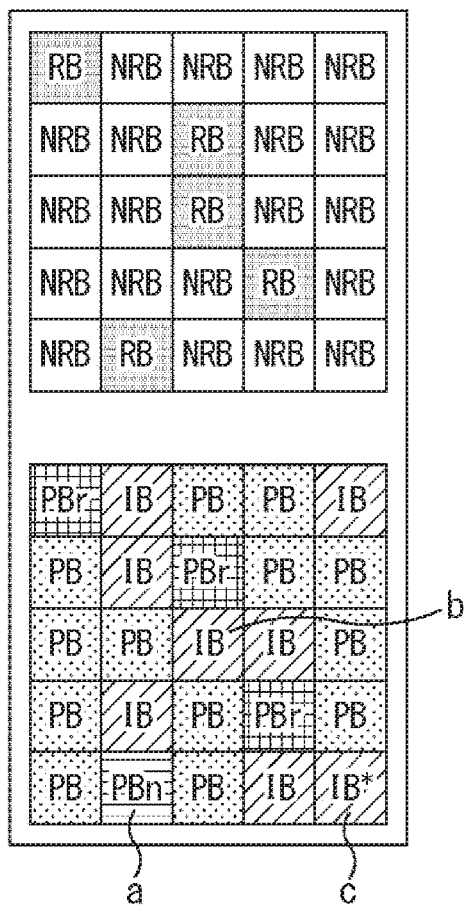

FIG. 14

| POSITION OF ⟨xy⟩ | | |
|---|---|---|
| ⟨00⟩ | ⟨10⟩ | ⟨20⟩ |
| ⟨01⟩ | ⟨11⟩ | ⟨21⟩ |
| ⟨02⟩ | ⟨12⟩ | ⟨22⟩ |

FIG. 15

| prev | | |
|---|---|---|
| N | N | N |
| N | N | N |
| N | N | N |

| cost_IB | | |
|---|---|---|
| 13 | 22 | 3 |
| 42 | 65 | 36 |
| 77 | 83 | 9 |

| cost_PBn | | |
|---|---|---|
| 23 | 4 | 11 |
| 26 | 15 | 13 |
| 33 | 5 | 18 |

*FIG. 16*

| cost_R | | | mode_R | | | cost_N | | | mode_N | | |
|---|---|---|---|---|---|---|---|---|---|---|---|
| 13 | 22 | 3 | IB | IB | IB | 13 | 4 | 3 | IB | PBn | IB |
| 42 | 65 | 36 | IB | IB | IB | 26 | 15 | 13 | PBn | PBn | PBn |
| 77 | 83 | 9 | IB | IB | IB | 33 | 5 | 9 | PBn | PBn | IB |

TABLE T1     TABLE T2

FIG. 17

| decided_cost | | |
|---|---|---|
| 13 | 4 | 3 |
| 26 | 15 | 13 |
| 33 | 5 | 9 |

| decided_mode | | |
|---|---|---|
| IB | PBn | IB |
| PBn | PBn | PBn |
| PBn | PBn | IB |

FIG. 18

| prev | | | cost_IB | | | cost_PBr | | | cost_PBn | | |
|---|---|---|---|---|---|---|---|---|---|---|---|
| R | N | R | 10 | 2 | 13 | 3 | - | 5 | 2 | 3 | 4 |
| N | N | N | 32 | 55 | 76 | - | - | - | 1 | 2 | 13 |
| N | N | R | 7 | 53 | 89 | - | - | 89 | 1 | 25 | 9 |

FIG. 19

TABLE T1

| cost_R | | | mode_R | | |
|---|---|---|---|---|---|
| 3 | 2 | 5 | PBr | IB | PBr |
| 32 | 55 | 76 | IB | IB | IB |
| 7 | 53 | 89 | IB | IB | PBr |

TABLE T2

| cost_N | | | mode_N | | |
|---|---|---|---|---|---|
| 2 | 2 | 4 | PBn | IB | PBn |
| 1 | 2 | 13 | PBn | PBn | PBn |
| 1 | 25 | 9 | PBn | PBn | PBn |

FIG. 20

| decided_cost | | |
|---|---|---|
| 3 | 2 | 5 |
| 32 | 2 | 13 |
| 7 | 53 | 9 |

| decided_mode | | |
|---|---|---|
| PBr | IB | PBr |
| IB | PBn | PBn |
| IB | IB | PBn |

FIG. 21

| prev | | |
|---|---|---|
| R | R | R |
| R | N | N |
| R | R | N |

| cost_IB | | |
|---|---|---|
| 11 | 3 | 14 |
| 30 | 50 | 70 |
| 1 | 13 | 34 |

| cost_PBr | | |
|---|---|---|
| 3 | 4 | 5 |
| 1 | – | – |
| 5 | 35 | – |

| cost_PBn | | |
|---|---|---|
| 2 | 3 | 4 |
| 1 | 2 | 13 |
| 1 | 25 | 9 |

FIG. 22

| cost_R | | | mode_R | | | cost_N | | | mode_N | | |
|---|---|---|---|---|---|---|---|---|---|---|---|
| 3 | 3 | 5 | PBr | IB | PBr | 2 | 3 | 4 | PBn | PBn | PBn |
| 1 | 50 | 70 | PBr | IB | IB | 1 | 2 | 13 | PBn | PBn | PBn |
| 1 | 13 | 34 | IB | IB | IB | 1 | 13 | 9 | PBn | IB | PBn |

TABLE T1 ⎬ (cost_R, mode_R)  
TABLE T2 ⎬ (cost_N, mode_N)

FIG. 23

| decided_cost | | |
|---|---|---|
| 3 | 3 | 5 |
| 1 | 50 | 70 |
| 1 | 13 | 34 |

| decided_mode | | |
|---|---|---|
| PBr | IB | PBr |
| PBr | IB | IB |
| IB | IB | IB |

IMAGE PROCESSING APPARATUS AND METHOD

CROSS REFERENCE TO RELATED APPLICATIONS

This application is a U.S. National Phase of International Patent Application No. PCT/JP2018/044461 filed on Dec. 4, 2018, which claims priority benefit of Japanese Patent Application No. JP 2017-241479 filed in the Japan Patent Office on Dec. 18, 2017. Each of the above-referenced applications is hereby incorporated herein by reference in its entirety.

TECHNICAL FIELD

The present disclosure relates to an image processing apparatus and a method, and more particularly, to an image processing apparatus and a method designed to smoothen data amounts and maintain subjective image quality.

BACKGROUND ART

In the case of a video codec that performs compression using temporal correlation, frames compressed with the use of intra-frame correlation (the frames are referred to as IFRs) and frames compressed with the use of inter-frame correlation (the frames are referred to as PFRs for convenience, though there is B for bidirectional reference). It is not possible to decode only PFRs. Therefore, it usually requires at least one IFR at the beginning of a stream. Also, to cope with errors in the transmission system and playback from the middle, IFRs are regularly inserted even in the middle of a stream. In general, an IFR requires a larger bit amount for obtaining the same image quality than a PFR, and the difference in size between an IFR and a PFR causes unevenness in the bit amount of a stream in the temporal direction.

The data in a frame is compressed on a block-by-block basis. The blocks include intra blocks (referred to as IBs) that can be decoded only with the data in the frame, and inter blocks that are decoded with reference to the data of a past frame (these inter blocks are referred to as PBs for convenience, though there is B for bidirectional or the like in practice). An IFR is allowed to have only IBs. On the other hand, a PFR is allowed to have both PBs and IBs.

The bit amount in an IB is often larger than that in a PB. Therefore, various methods have been suggested for realizing the smoothing of data amounts in a frame by arranging IBs in a scattered manner in a PFR, instead of an IFR in the middle of a stream. When IBs are arranged in a scattered manner in a PFR, the arrangement is adjusted so that a certain degree of tolerance for playback from the middle of a stream or errors can be secured (see Patent Document 1).

In an example, IBs are arranged in a horizontal or vertical stripe, and control is performed so that PB reference does not cross the portion at which the IBs are disposed in a stripe (this portion is referred to as the IB stripe portion). An operation to move the IB stripe portion sequentially for each frame as if to refresh the screen is performed, to cut off the relationship with the past frames. In this manner, it is possible to guarantee restoration of an image within a certain time.

CITATION LIST

Patent Document

Patent Document 1: Japanese Patent Application Laid-Open No. 2013-165340

SUMMARY OF THE INVENTION

Problems to be Solved by the Invention

By the above described method, however, the PB reference is cut off by the IB stripe portion serving as a boundary, and efficient reference cannot be performed. Furthermore, a stripe portion moving on the screen is highly likely to be seen in decoded images, and high compression quality is not achieved very often.

The present disclosure has been made in view of such circumstances, and aims to smoothen data amounts and maintain subjective image quality.

Solutions to Problems

An image processing apparatus according to one aspect of the present technology includes: a cost calculation unit that calculates costs of prediction modes of the respective blocks constituting the current frame; and a refresh mode determination unit that selects prediction modes of the respective blocks, on the basis of the costs and refreshed blocks that are the blocks refreshed in a previous frame that is located before the current frame timewise.

According to one aspect of the present technology, the costs of prediction modes of the respective blocks constituting the current frame are calculated. The prediction modes of the respective blocks are then selected, on the basis of the calculated costs and refreshed blocks that are the blocks refreshed in a previous frame that is located before the current frame timewise.

Effects of the Invention

According to the present technology, it is possible to smoothen data amounts and maintain subjective image quality.

Note that the advantageous effects described in this specification are merely examples, and the advantageous effects of the present technology are not limited to them and may include some additional effects.

BRIEF DESCRIPTION OF DRAWINGS

FIG. 7 is a diagram for explaining the refresh mode determination process for the first frame.

FIG. 8 is a diagram for explaining the refresh mode determination process for the second frame.

FIG. 9 is a diagram for explaining the refresh mode determination process for the third frame.

FIG. 11 is a diagram showing a state of a first frame.

FIG. 12 is a diagram showing a state of a second frame.

FIG. 13 is a diagram showing the states of blocks before encoding of a third frame.

FIG. 14 is a diagram for explaining the positions of the blocks in a frame.

FIG. 15 is a diagram showing a prev table, cost_IB, and cost_PBn in a zeroth frame.

FIG. 16 is a diagram showing a table T1 and a table T2 in the zeroth frame.

FIG. 17 is a diagram showing decided_cost and decided_mode in the zeroth frame.

FIG. 18 is a diagram showing a prev table, cost_IB, cost_PBn, and cost_PBr in a first frame.

FIG. 19 is a diagram showing the table T1 and the table T2 in the first frame.

FIG. 20 is a diagram showing decided_cost and decided_mode in the first frame.

FIG. 21 is a diagram showing a prev table, cost_IB, cost_PBn, and cost_PBr in a second frame.

FIG. 22 is a diagram showing the table T1 and the table T2 in the second frame.

FIG. 23 is a diagram showing decided_cost and decided_mode in the second frame.

MODE FOR CARRYING OUT THE INVENTION

The following is a description of a mode for carrying out the present disclosure (the mode will be hereinafter referred to as an embodiment).

<Outline>

Figure 1:
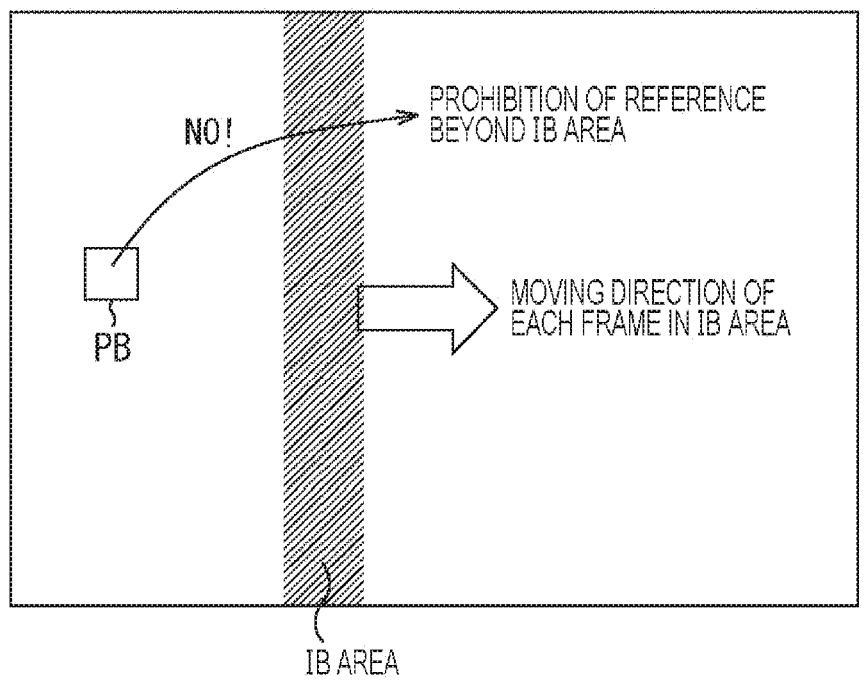
FIG. 1 is a diagram for explaining a method for arranging IBs in a PFR.

FIG. 1 is a diagram for explaining a method for arrangement intra blocks in a frame compressed with the use of inter-frame correlation.

A frame compressed with the use of intra-frame correlation is called an intra-coded frame (IFR). A frame compressed with the use of inter-frame correlation is referred to as a predicted frame (PFR) for convenience, though there also is B for bidirectional reference. An intra block that can be decoded only with intra-frame data is referred to as an IB. An inter block that is decoded with reference to the data of past frames is referred to as a PB for convenience, though there is also B for bidirectional or the like in practice.

FIG. 1 shows a frame in which a vertically striped IB area indicated by hatching is formed. IBs are disposed in the IB area. PB reference is restricted so as not to cross the IB area in the frame.

An operation of sequentially moving the IB area for each frame as if to refresh the inside of the screen (hereinafter such an operation like refreshing a screen will be referred to as refresh in a screen) is performed, so that the relationship with the past frames can be cut off. The method illustrated in FIG. 1 can guarantee restoration of an image within a certain time.

In the method illustrated in FIG. 1, however, the IB area serving as a boundary cuts off PB reference, and it is difficult to perform efficient reference. Furthermore, the striped IB area moving sequentially from left to right on the screen (this movement will be hereinafter referred to as scan) is likely to be seen in decoded images, and high compression quality is not achieved very often.

The above described method has the two features described below.

(1) The inside of a frame is scanned with the striped IB area or by some other technique, so that the inside of the screen is refreshed. At this stage, the position of the IB area in the frame clearly indicates the region that has already been refreshed and the region that has not been refreshed. In FIG. 1, the left side of the IB area is the refreshed region, and the right side is the region that has not been refreshed yet.

(2) There are restrictions on transition of an area to be referred to by PBs that are behind timewise in the already refreshed, to an already refreshed region. Since the refreshed region has been made clear in (1), it is possible to realize the feature (2) by restricting the reference region.

As the refreshed region and the unrefreshed region are statically divided by the feature (1), the IB area appears as a difference in image quality in decoded images, and is likely to be easily recognized. The term "statically divided" means that, even if frames are changed, the frame can be divided by the region defined as the IB area serving as a boundary.

The feature (2) also restricts the reference region, leading to a decrease in compression efficiency.

Therefore, the present technology is to achieve refresh and restrictions on the reference region in the screen within a certain time, basically without the above features (1) and (2).

Conceptually, the positions of IBs are not set in a statically fixed region as in (1), but IBs are randomly arranged in the screen. The random arrangement of IBs makes it difficult to visually recognize the difference in image quality between IBs and PBs.

However, since IBs are randomly arranged, it is difficult to distinguish between the refreshed region and the unrefreshed region, and statically restrict the PB reference region.

In the present technology, a table indicating the past arrangement of IBs is referred to when the reference region is to be restricted. Furthermore, to enhance the overall compression efficiency, not only the PB reference region is simply restricted, but also the costs of the entire screen are calculated. The optimum value of the calculated costs is then used for determining a prediction mode of IBs and PBs. Hereinafter, a prediction mode will be referred to simply as a mode.

Further, the present technology adopts a concept that, if the refreshed region becomes larger simply with time, the entire screen will be eventually refreshed.

Next, the present technology is specifically described.

<Example Configuration of an Encoding Device>

Figure 2:
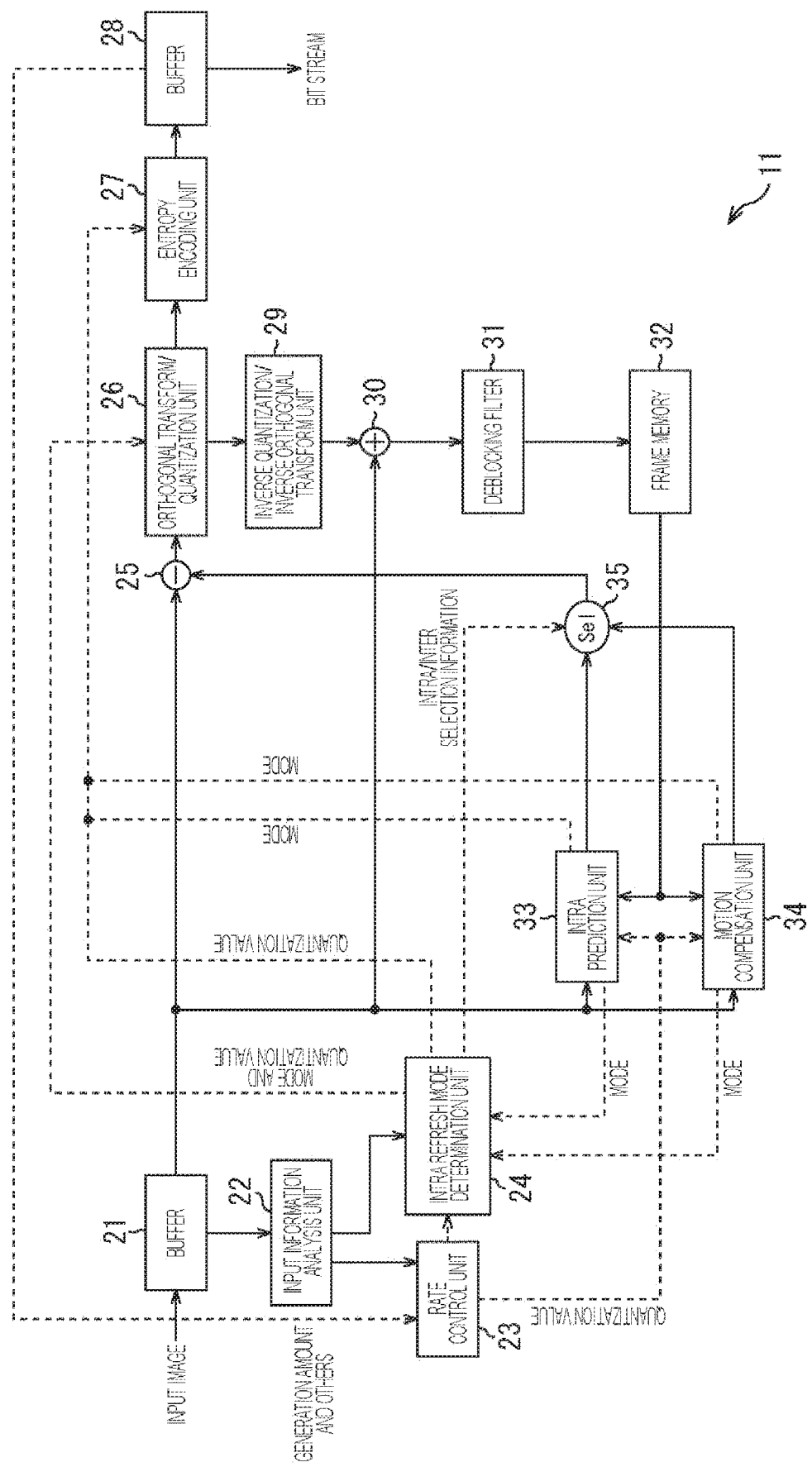
FIG. 2 is a block diagram showing an example configuration of an embodiment of an encoding device to which the present disclosure is applied.

FIG. 2 is a block diagram showing an example configuration of an embodiment of an encoding device to which the present technology is applied.

An encoding device 11 in FIG. 2 encodes an image by a method compliant with HEVC. For example, the encoding device 11 can be designed as an imaging device, including an imaging unit. The encoding device 11, together with the later described decoding device 101 shown in FIG. 29, can form a communication system. Images on a frame-by-frame basis are input as encoding targets to the encoding device 11.

A frame represents the data of one screen, and is formed with blocks for compression. The blocks are unit blocks for compression such as Moving Picture Experts Group (MPEG). The blocks are often called macroblocks, coding blocks, or coding units. Processing such as motion compensation and DCT is performed on a block-by-block basis. The blocks include IBs and PBs described above.

The encoding device 11 includes a buffer 21, an input information analysis unit 22, a rate control unit 23, an intra refresh mode determination unit 24, an arithmetic operation unit 25, an orthogonal transform/quantization unit 26, an entropy encoding unit 27, a buffer 28, an inverse quantization/inverse orthogonal transform unit 29, and an addition unit 30. The encoding device 11 also includes a deblocking filter 31, a frame memory 32, an intra prediction unit 33, a motion compensation unit 34, and a selector 35.

The images on a frame-by-frame basis that have been input as encoding targets are stored in the buffer 21. The buffer 21 rearranges the images on a frame-by-frame basis stored in the display order into images in the encoding order according to the GOP structure. The buffer 21 outputs the rearranged images to the arithmetic operation unit 25, the addition unit 30, the intra prediction unit 33, and the motion compensation unit 34.

The input information analysis unit 22 analyzes the images stored in the buffer 21, and supplies information indicating the result of the analysis to the rate control unit 23 and the intra refresh mode determination unit 24. For example, the input information analysis unit 22 analyzes difficulty. The difficulty of an entire image is an index indicating the complexity of the image. The difficulty is normally a value obtained by summing the square values of the mean value of the pixels in each block and the difference value of each pixel (equivalently, a mean squared error (MSE)) or the like.

On the basis of the information supplied from the input information analysis unit 22 and coded data stored in the buffer 28, the rate control unit 23 calculates the quantization value index for controlling the rate of the quantization operation of the orthogonal transform/quantization unit 26, and supplies the calculated quantization value index. The quantization value index is calculated so that neither overflow nor underflow will occur. The calculated quantization value index is supplied to the intra refresh mode determination unit 24, the intra prediction unit 33, and the motion compensation unit 34. The quantization value index is used for calculating costs in the intra prediction unit 33 and the motion compensation unit 34.

The intra refresh mode determination unit 24 receives inputs of optimum intra mode information and the corresponding cost function value (hereinafter referred to simply as a cost) supplied from the intra prediction unit 33, and optimum inter mode information and the corresponding cost supplied from the motion compensation unit 34.

A cost indicates the load when encoding is performed on a block-by-block basis. A cost is basically calculated from compression distortion and a generation amount (rate). Those with smaller distortion and smaller generation amounts have smaller costs. The smallest-cost mode, which is the mode with the smallest cost, is selected as the optimum mode, so that compression efficiency can be enhanced.

The intra refresh mode determination unit 24 performs a refresh mode determination process, on the basis of the optimum intra mode information and cost supplied from the intra prediction unit 33 and the optimum inter mode information and cost supplied from the motion compensation unit 34. The refresh mode determination process is a process of determining the optimum mode for refresh, using an algorithm according to the present technology.

Refresh means that an image can be generated and reconstructed only with past frame data, even if there is an error in the frame data. Refresh on a block-by-block basis indicates blocks to be compressed using only correct data in a frame, which are IBs. Refresh on a frame-by-frame basis indicates frames that can be completely recovered after an error.

The intra refresh mode determination unit 24 determines a mode for each block, on the basis of the result of determination in the refresh mode determination process. The intra refresh mode determination unit 24 supplies intra/inter selection information determined for each block to the selector 35.

The intra refresh mode determination unit 24 also determines the quantization value corresponding to the determined optimum mode on the basis of the quantization value index calculated by the rate control unit 23, and supplies information indicating the optimum mode and the quantization value corresponding to the optimum mode to the orthogonal transform/quantization unit 26.

The arithmetic operation unit 25 subtracts the predicted image supplied from the selector 35, from the image supplied from the buffer 21. The arithmetic operation unit 25 outputs the image obtained from the subtraction as residual error information (a difference) to the orthogonal transform/quantization unit 26. Note that, in a case where any predicted image is not supplied from the selector 35, the arithmetic operation unit 25 outputs the image read from the buffer 21 as the residual error information to the orthogonal transform/quantization unit 26.

The orthogonal transform/quantization unit 26 performs an orthogonal transform process on the residual error information calculated by the arithmetic operation unit 25, and quantizes the result of the orthogonal transform process. The orthogonal transform is performed by discrete cosine transform (DCT) or discrete sine transform (DST), for example. The orthogonal transform/quantization unit 26 supplies the quantization value obtained as a result of the orthogonal transform/quantization process to the entropy encoding unit 27.

The entropy encoding unit 27 acquires, from the intra prediction unit 33, intra mode information that is information indicating the optimum intra mode. The intra mode information is information indicating the block size, the prediction direction, and the like.

The entropy encoding unit 27 also acquires, from the motion compensation unit 34, inter mode information that is information indicating the optimum inter mode, the motion vector, information for identifying the reference image, and the like. The inter mode information is information indicating the block size and the like.

The entropy encoding unit 27 performs lossless encoding, such as variable-length encoding (context-adaptive variable length coding (CAVLC) or the like, for example) or arithmetic encoding (context-adaptive binary arithmetic coding (CABAC) or the like, for example), on the quantization value quantized by the orthogonal transform/quantization unit 26. Huffman coding or the like may also be used.

The entropy encoding unit 27 also performs lossless encoding on encoding information relating to encoding, which are the intra mode information or the inter mode information, the motion vector, and the information for identifying the reference image. The entropy encoding unit 27 supplies the buffer 28 with the encoding information and the quantization value subjected to the lossless encoding as coded data.

The buffer 28 temporarily stores the coded data encoded by the entropy encoding unit 27. The buffer 28 also transmits the stored coded data together with the parameter set and various headers as a bit stream.

The quantization value quantized by the orthogonal transform/quantization unit 26 is also input to the inverse quantization/inverse orthogonal transform unit 29. The inverse quantization/inverse orthogonal transform unit 29 inversely quantizes the quantization value, and performs an inverse orthogonal transform process on an orthogonal transform process result obtained as a result of the inverse quantization. The inverse orthogonal transform is performed by inverse discrete cosine transform (IDCT) or inverse discrete sine transform (IDST), for example. The inverse quantization/inverse orthogonal transform unit 29 supplies the residual error information obtained as a result of the inverse orthogonal transform process to the addition unit 30.

The addition unit 30 adds the residual error information that has been orthogonally transformed by the inverse quantization/inverse orthogonal transform unit 29 to the image supplied from the buffer 21, and thus, performs decoding. The addition unit 30 supplies the decoded image to the deblocking filter 31.

The deblocking filter 31 performs an adaptive deblocking filtering process on the image supplied from the addition unit 30, to remove block distortion. The resultant image is supplied to the frame memory 32.

The frame memory 32 stores the image on which the deblocking filter 31 has performed the adaptive deblocking filtering process. The image stored in the frame memory 32 is supplied as a peripheral image to the intra prediction unit 33, and is output as the reference image to the motion compensation unit 34.

Using the peripheral image that has been read from the frame memory 32, the intra prediction unit 33 performs an intra prediction process in all candidate intra modes.

On the basis of the image read from the buffer 21 and the predicted images generated as a result of the intra prediction process, the intra prediction unit 33 calculates costs of all the candidate intra modes. The intra prediction unit 33 then determines the intra mode with the smallest cost to be the optimum intra mode.

The intra prediction unit 33 supplies the predicted image generated in the optimum intra mode to the selector 35, and supplies the intra mode information and the corresponding cost to the intra refresh mode determination unit 24. In a case where the predicted image generated in the optimum intra mode is selected by the selector 35, the intra prediction unit 33 supplies the intra mode information to the entropy encoding unit 27.

The motion compensation unit 34 performs a motion prediction/compensation process in all candidate inter modes. Specifically, the motion compensation unit 34 detects the motion vectors of all the candidate inter modes, on the basis of the image supplied from the buffer 21 and the reference image read from the frame memory 32. The motion compensation unit 34 then performs a compensation process on the reference image on the basis of the motion vectors, and generates predicted images.

At this stage, the motion compensation unit 34 calculates the costs of all the candidate inter modes on the basis of the image supplied from the buffer 21 and the predicted images, and determines the inter mode with the smallest cost to be the optimum inter mode. The motion compensation unit 34 then supplies the predicted image generated in the optimum inter mode to the selector 35, and supplies the inter mode information and the corresponding cost to the intra refresh mode determination unit 24.

In a case where the predicted image generated in the optimum inter mode is selected by the selector 35, the motion compensation unit 34 outputs the inter mode information, the corresponding motion vector, the information for identifying the reference image, and the like to the entropy encoding unit 27.

The selector 35 selects the predicted image supplied from the intra prediction unit 33 or the predicted image supplied from the motion compensation unit 34 on the basis of the intra/inter selection information selected by the intra refresh mode determination unit 24, and outputs the selected predicted image to the arithmetic operation unit 25.

<Refresh Mode Determination Processes>

Refresh mode determination processes to be performed by the intra refresh mode determination unit 24 are now described. The intra refresh mode determination unit 24 performs a refresh mode determination process in which the intra refresh mode determination unit 24 determines whether the block has been refreshed or not refreshed in the previous frame located before timewise (in the past), and thus, selects the optimum mode for refresh.

Hereinafter, a refreshed block will be referred to as an RB (refreshed block), and a block that has not been refreshed will be referred to as an NRB (unrefreshed block). An RB area indicates the region formed with RBs in the region to which PBs refer, and an NRB area is a region formed with NRBs in the region to which PBs refer.

In a state before the mode of a block at time t is determined, an RB is a block that was an IB at time t−1, or is a block that was an RB and a PB referring only to the RB area.

In the state before the mode of a block at time t is determined, an NRB is a block that was an NRB at time t−1, or is a block that was an RB but was also a PB referring to portions including the NRB area.

Note that, for convenience, a PB that refers to the RB area will be hereinafter referred to as a PBr, and a PB that refers to portions including the NRB area will be hereinafter referred to as a PBn. However, any PB will be referred to as a PB only in cases where there is no need to distinguish PBs.

One round of refresh operations by IBs is called a set. For example, there are 25 blocks in a frame formed with 5×5 blocks, and the number of RBs increases by five for each frame. When the round advances five frames, refresh operations have completed one round, all the blocks have turned into RBs, and one set has been completed. At the beginning of each set, all the blocks are NRBs.

<Example Relationship Between Block States and Modes>

Figure 3:
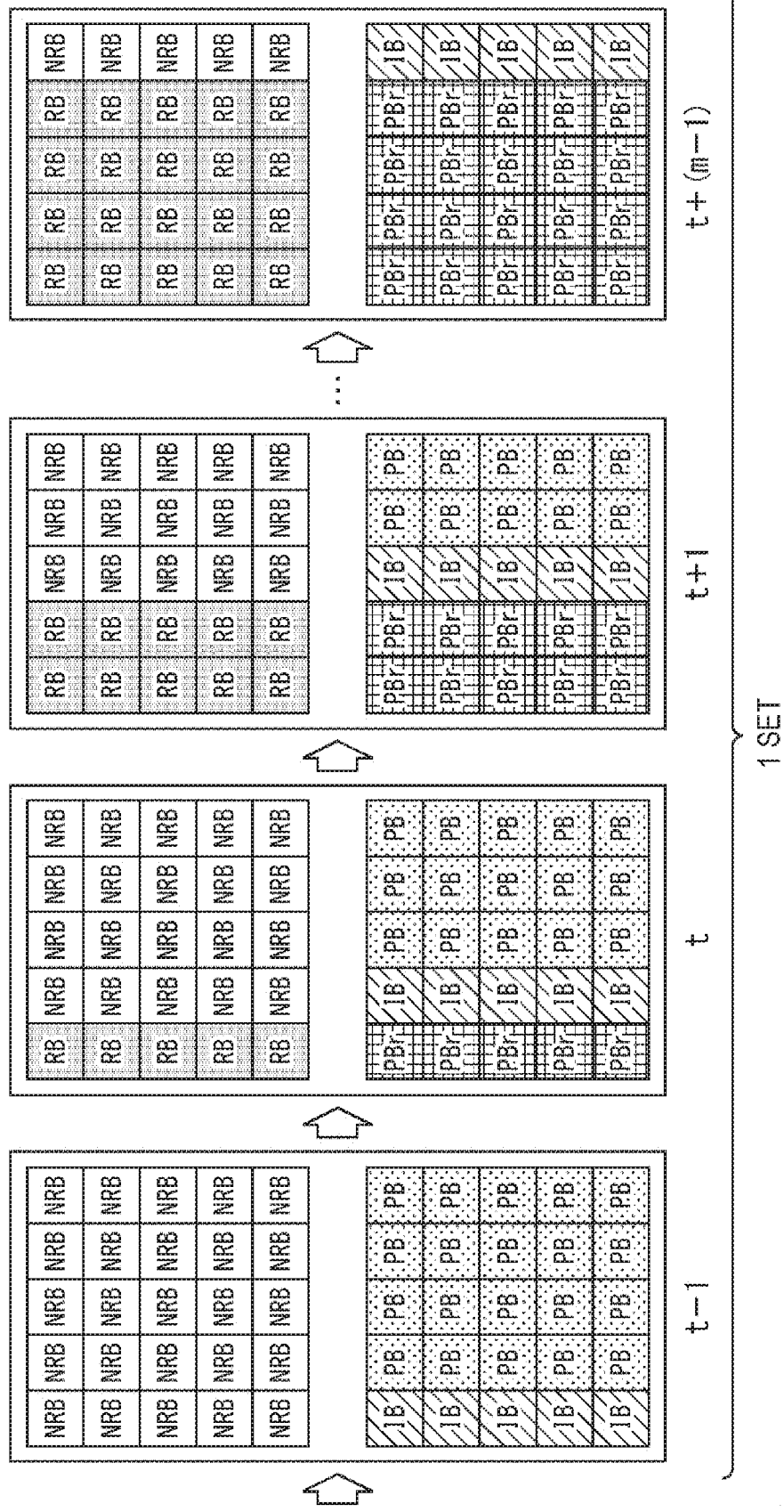
FIG. 3 is a diagram showing the relationship between block states and modes in refresh mode determination processes.

FIG. 3 is a diagram showing the relationship between block states and modes in refresh mode determination processes.

FIG. 3 shows an example in which one frame is formed with 5×5 blocks. The upper half shows the states of the blocks during the period from after encoding at a time earlier than the current time till the time before the encoding at the current time. The lower half shows the modes of the blocks as a result of the encoding at the current time. The same applies to the drawings described below, unless otherwise specified. Times t−1, t, t+1, . . . , t+(m−1), and t+m are shown below the lower half.

Before the encoding at time t−1, all the blocks were NRBs. As a result of the encoding at time t−1, the five blocks in the first column from the left turn into IBs, and the remaining 20 blocks turn into PBs.

Before the encoding at time t, the five leftmost blocks that were IB at time t−1 are RBs, and the remaining 20 blocks are NRBs. As a result of the encoding at time t, the five blocks in the first column turn into PBrs, the five blocks in the second column turn into IBs, and the remaining 15 blocks turn into PBs.

Before the encoding at time t+1, the five blocks in the first column that were PBrs at time t and the five blocks in the second column that were IBs are RBs, and the remaining 15 blocks are NRBs. As a result of the encoding at time t, the 10 blocks in the first and second columns turn into PBrs, the five blocks in the third column turn into IBs, and the remaining 10 blocks turn into PBs.

Before the encoding at time t+(m−1), the 20 blocks in the first through fourth columns, which were PBrs at time t+(m−2) (not shown), are RBs, and the five blocks in the fifth column are NRBs. As a result of the encoding at time t+(m−1), the 20 blocks in the first through fourth columns turn into PBrs, and the five blocks in the fifth column turn into IBs.

Figure 4:
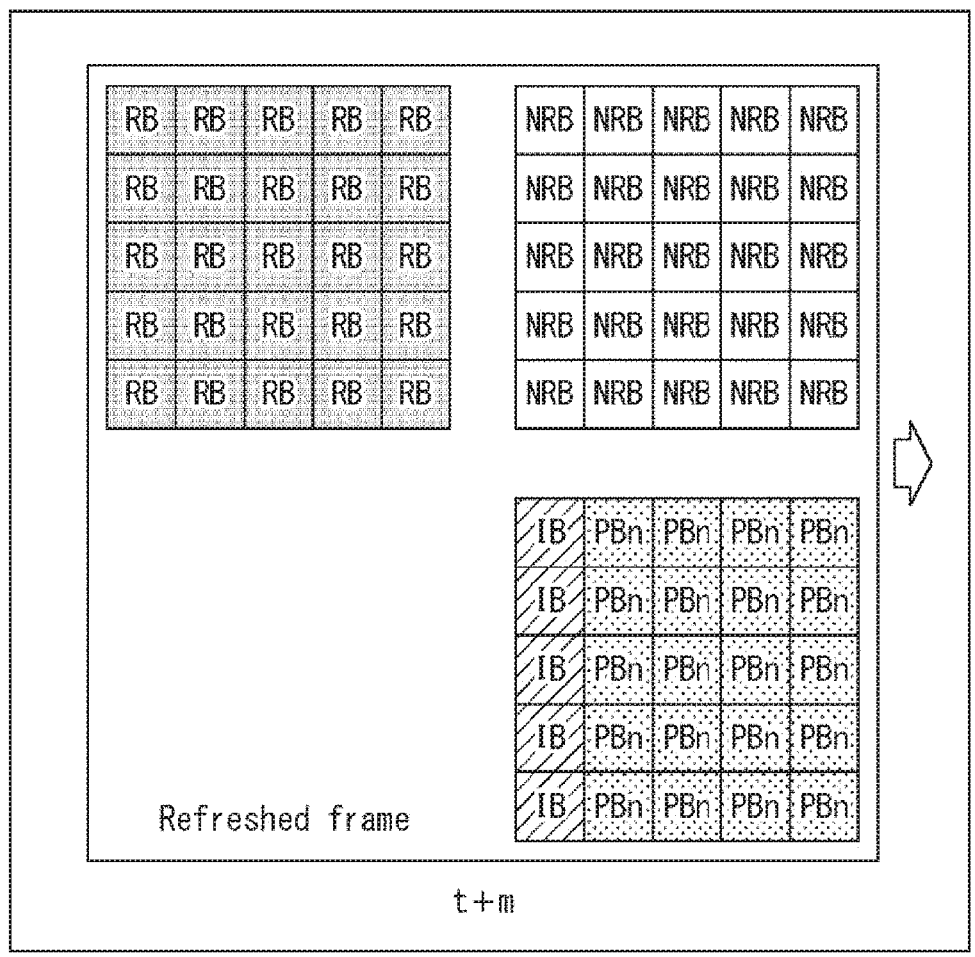
FIG. 4 is a diagram showing the relationship between the states of blocks and modes as a result of one round of refresh mode determination processes.

As described above, as a result of one round of operations for one set from time t−1 till time t+(m−1), the frame at time t+m turns into a refreshed frame in which all the blocks are RBs as shown at the left side in FIG. 4.

FIG. 4 is a diagram showing the relationship between the states of blocks and modes as a result of one round of refresh mode determination processes.

As shown at the right side in FIG. 4, the next new set of processes is performed. Before the encoding at time t+m, all the blocks are reset to NRBs as in the state before the encoding at time t−1. As a result of the encoding at time t+m, the five blocks in the first column turn into IBs, and the remaining 20 blocks turn into PBns.

Note that, in the above example shown in FIGS. 3 and 4, IBs are aligned vertically as in the vertically-striped IB area described with reference to FIG. 1, and are sequentially moved frame by frame by refresh mode determination processes of the present technology. However, IBs can be randomly arranged by refresh mode determination processes of the present technology as described below.

<Block State Transitions>

Figure 5:
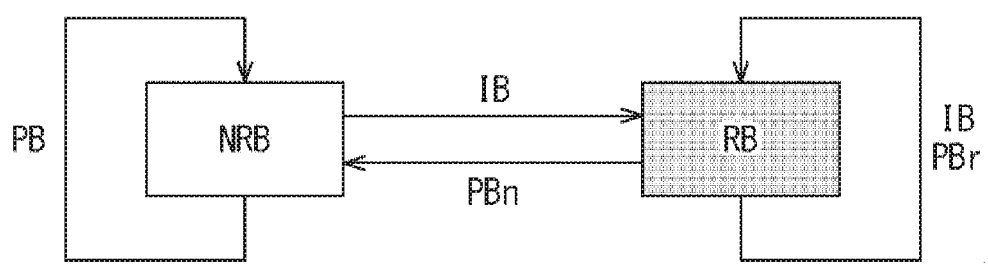
FIG. 5 is a diagram showing block state transitions.

FIG. 5 is a diagram showing block state transitions.

If the result of encoding indicates PB, a block that is an NRB before the encoding remains an NRB in the frame located later (in the future) timewise, as indicated by a solid arrow. Further, if the result of encoding indicates IB, a block that is an NRB before the encoding turns into an RB in the subsequent frame as indicated by a thick arrow.

On the other hand, if the result of encoding indicates IB or PBr, a block that is an RB before the encoding can remain an RB in the subsequent frame as indicated by a solid arrow. If the result of encoding indicates PBn, a block that is an RB before the encoding turns into an NRB in the subsequent frame as indicated by a thick arrow.

<Basic Procedures According to the Present Technology>

Figure 6:
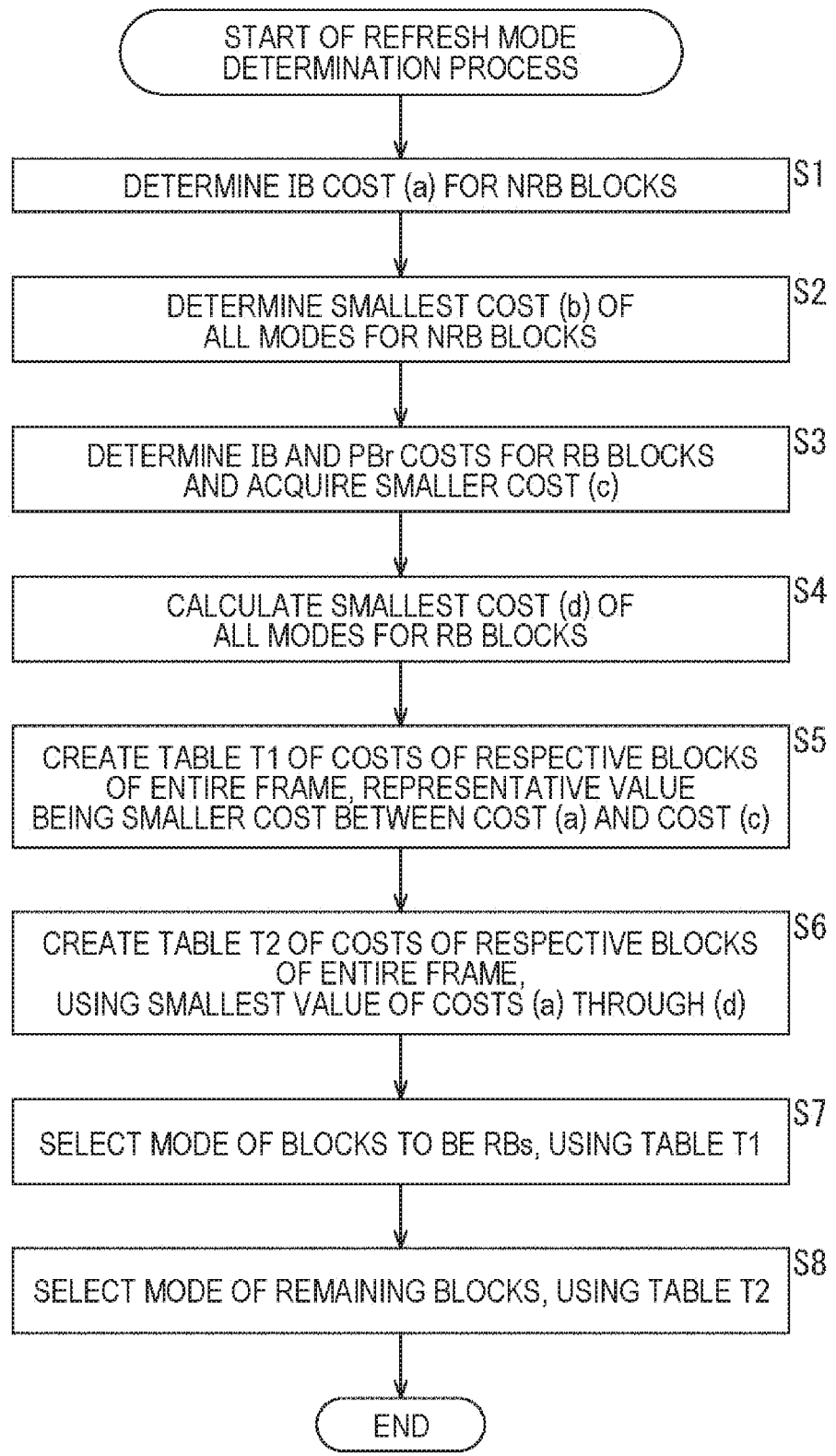
FIG. 6 is a flowchart for briefly explaining a refresh mode determination process.

FIG. 6 is a flowchart for briefly explaining a refresh mode determination process.

In step S1, the intra refresh mode determination unit 24 determines the IB cost (a) for an NRB block. The IB cost (a) is the cost of a candidate for an RB.

In step S2, the intra refresh mode determination unit 24 determines the smallest cost (b) of all the modes for the NRB block.

In step S3, the intra refresh mode determination unit 24 determines the IB and PBr costs for the RB block, and acquires the smaller cost (c). The smaller cost (c) is the cost for maintaining the RB. Information indicating the mode of the smaller cost (c) is stored into a memory inside the intra refresh mode determination unit 24.

In step S4, the intra refresh mode determination unit 24 determines the smallest cost (d) of all the modes for the RB block.

In step S5, the intra refresh mode determination unit 24 creates a table T1 including the costs of the respective blocks as the representative values, which are the smaller ones of the costs (a) and the costs (c).

In step S6, the intra refresh mode determination unit 24 creates a table T2 including the costs of the respective blocks of the entire frame, putting the costs (a) through (d) into the table T2. In the table T2, the cost with the smallest value is selected from among the costs of different modes of the same block. Information indicating the mode of the selected cost is stored into the memory.

In step S7, the intra refresh mode determination unit 24 selects the mode of the blocks to be RBs, using the table T1. The intra refresh mode determination unit 24 selects N+n blocks in order from the smallest value of the costs in the table T1, and sets the mode of the selected blocks to the mode corresponding to the cost of the selected blocks. The blocks selected here turn into RBs.

Here, N is 0 at the beginning of the set, and n is a natural number indicating the number of RBs to be added for each frame. Every time one frame is encoded, N is updated as N+n.

In step S8, using the table T2, the intra refresh mode determination unit 24 selects the mode of each block among the remaining blocks not selected with the table T1. The blocks selected here turn into NRBs.

Through the above process, processing of one set is completed after the total number of blocks/n frames, and the refresh of frame data is completed. As the cost with the smallest value is selected at the time of cost calculation, the mode of each block can obtain an optimum value.

<Specific Examples of Operations>

Figure 7:
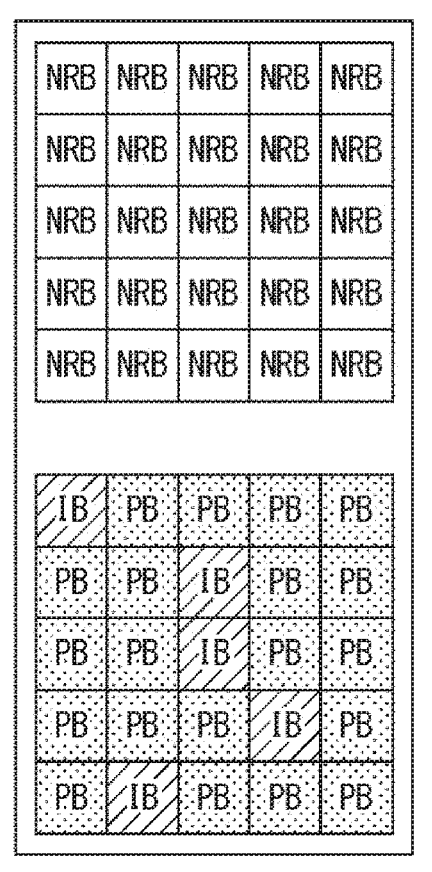

FIG. 7 is a diagram for explaining the refresh mode determination process for the first frame. Note that the explanation below will be made with reference to FIG. 6.

As shown in the upper half of FIG. 7, at the beginning of one set, all the blocks are NRBs. Therefore, the processing for RBs in steps S3 and S4 in FIG. 6 is not performed.

In steps S1 and S2, the intra refresh mode determination unit 24 calculates the costs (a) and the costs (b) for all the blocks (NBs). Note that, in practice, the costs (b) are not necessary at the start of the process. In steps S4 and S5, the tables T1 and T2 are created. In step S6, the IBs having the smallest cost are selected from the table T1.

Note that the number of blocks is 5×5 herein, N being 25, n being 5. Through the processing in step S6, five IBs having the smallest cost are selected as shown in the lower half of FIG. 7. In the lower half of FIG. 7, the block in the first column from the left and in the first row from the top, the block in the second column and in the fifth row, the blocks in the third column and in the second and third rows, and the block in the fourth column and in the fourth row are selected as IBs.

For the remaining blocks other than the IBs, the mode is selected through the processing in step S7. Note that, since all the blocks are NRBs at the beginning of the set, PBns and PBrs are regarded as the same. Accordingly, in the lower half of FIG. 7, the remaining blocks other than the IBs are shown as PBs.

In the first frame, each block is encoded according to the mode selected as described above, and the processing of the first frame is completed.

Figures 8, 9:
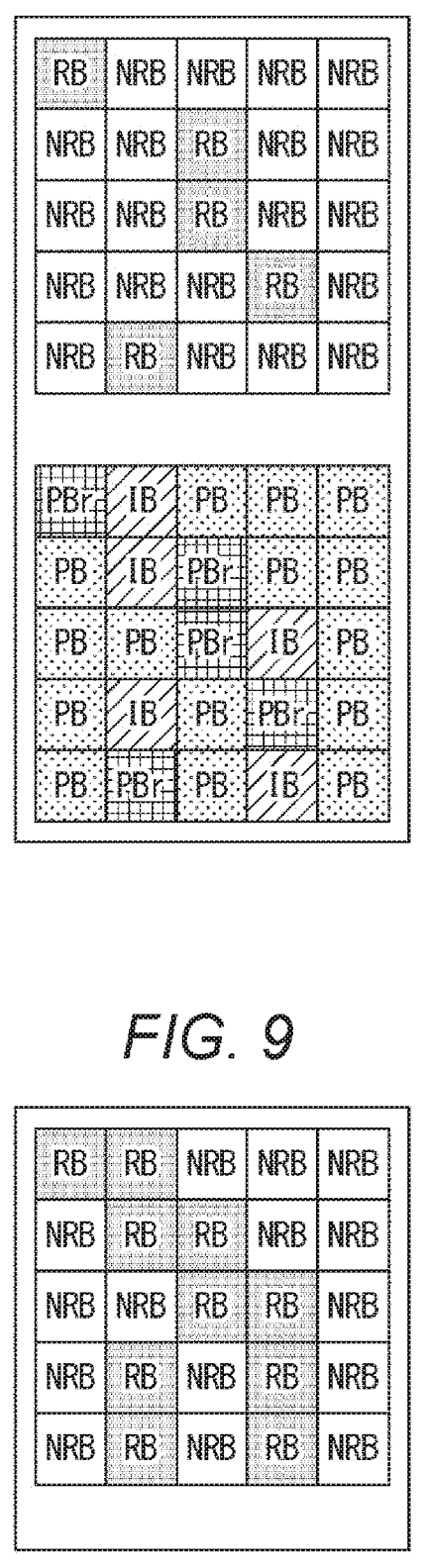

FIG. 8 is a diagram for explaining the refresh mode determination process for the second frame.

The upper half of FIG. 8 shows the states of the blocks before encoding of the second frame. The blocks that have turned into IBs as a result of the encoding of the first frame are RBs, and the other blocks are NRBs.

The intra refresh mode determination unit 24 sequentially performs the processing in steps S1 through S4 in FIG. 6 on the RB blocks and the NRB blocks, and creates the tables T1 and T2 in steps S5 and S6, respectively.

In step S7, the intra refresh mode determination unit 24 selects the mode of the 10 blocks to be RBs, using the table T1. The mode of each of the selected blocks is IB or PBr.

The lower half of FIG. 8 shows the states of the blocks before the encoding of the second frame.

In the lower half of FIG. 8, the block in the first column from the left and in the first row from the top, the block in the second column and in the fifth row, the blocks in the third column and in the second and third rows, and the block in the fourth column and in the fourth row are selected as PBrs. Also, the blocks in the second column and in the first, second, and fourth rows from the top, and the blocks in the fourth column and in the third and fifth rows are selected as IBs.

In step S8, the intra refresh mode determination unit 24 selects the mode of the remaining blocks, using the table T2. Although the selected mode of the blocks is collectively shown as PB in the lower half of FIG. 8, the selected mode is PBr or PBn in practice.

In the second frame, each block is encoded according to the mode selected as described above, and the processing of the second frame is completed.

FIG. 9 is a diagram for explaining the refresh mode determination process for the third frame.

FIG. 9 is a diagram showing the state after the end of the second frame, which is the states of the blocks before encoding of the third frame.

The blocks that have turned into IBs and PBrs through the encoding of the second frame turn into RBs, and the other blocks turn into NRBs.

The above process is repeated until all the blocks turn into RBs. When all the blocks have turned into RBs, the one set is completed. After that, all the blocks are reset to NRBs, and the process is repeated from the start.

In the above described example, the blocks that have once turned into RBs do not turn into NRBs again. In practice, when selection based on costs is performed through the above described refresh mode determination process according to the present technology, RBs might turn into NRBs, or more RBs than specified might appear.

<Exceptional Examples>

Figure 10:
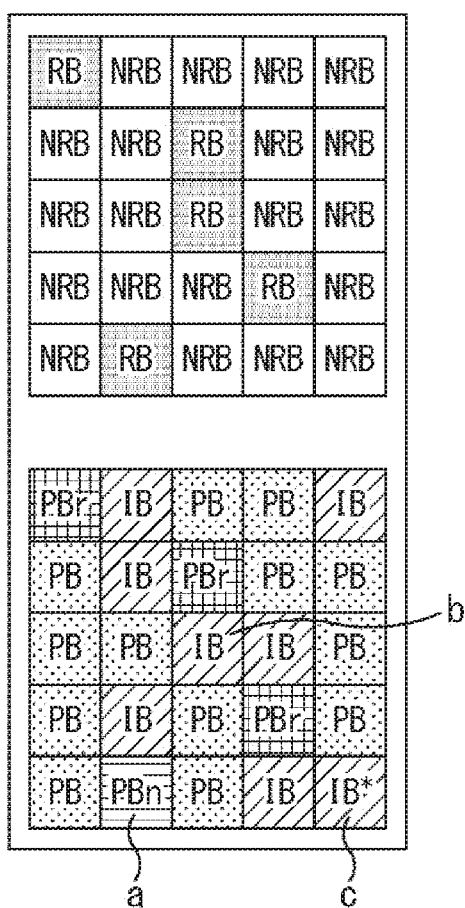
FIG. 10 is a diagram showing an example in which blocks that have once turn into RBs again turn into NRBs.

FIG. 10 is a diagram showing an example in which blocks that have once turn into RBs again turn into NRBs.

Like the upper half of FIG. 8, the upper half of FIG. 10 shows the states of the blocks before encoding of the second frame. The blocks that have turned into IBs as a result of the encoding of the first frame are RBs, and the other blocks are NRBs.

The lower half of FIG. 10 differs from the lower half of FIG. 8 in that a block a is not a PBr but a PBn, a block b is not a PBr but an IB, and a block c is not a PB but an IB*.

Specifically, when the mode of 10 blocks to be RBs is selected (step S7 in FIG. 6), the IBs and the PBrs in the lower half of FIG. 10 are the candidates for RBs. The candidates for RBs turn into RBs at the next timing. However, the block a, which was originally an RB, is not selected at the next timing, and turns into a PBn. Instead of the block a, another NRB becomes a candidate for an RB, and turns into IB.

In the case of the block a, a block that has once turned into an RB again turns into an NRB. However, according to the present technology, it is apparent that the cost is lower when a block that has once turned into an RB again turns into an NRB. Therefore, a determination is made so that even a block that has once turned into an RB is again made to turn into an NRB.

A selection is made so that another NRB, instead of the block a, is made to turn into an RB, and it is guaranteed that the total number of RBs will increase.

The block b that has once turned into an RB because the block b was an IB again turns into an IB in some cases. It is determined that the cost is lower when the block b again turns into an IB.

In FIG. 10, the IB* shown in the block c indicates the IB that has been selected as the 11th selected IB after a predetermined number "10" of blocks have been selected. The block c does not need to be an IB for the purpose of sequential refresh, but an IB may be selected as a result of cost calculation, and the number of RBs might eventually increase.

It is still the case that the number n of RBs increases for each frame, and finally reaches n=N. Thus, it can be guaranteed that the refresh will be completed.

Figure 11:
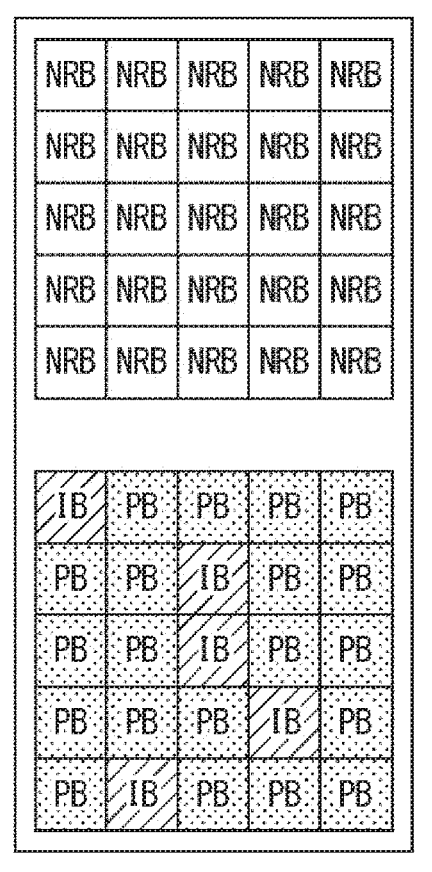

Further, an example in which a block that has once turned into an RB again turns into an NRB will be specifically described, with reference to FIGS. 11 through 13.

FIG. 11 is a diagram showing the state of the same first frame as that shown in the case illustrated in FIG. 7.

For the first frame, basically the same processing as that in the case illustrated in FIG. 7 is performed. Therefore, the explanation starts from the processing for the second frame shown in FIG. 12.

FIG. 12 is a diagram showing the state of the second frame.

Like the upper half of FIG. 8, the upper half of FIG. 12 shows the states of the blocks before encoding of the second frame. The blocks that have turned into IBs as a result of the encoding of the first frame are RBs, and the other blocks are NRBs.

The intra refresh mode determination unit 24 sequentially performs the processing in steps S1 through S4 in FIG. 6 on the RB blocks and the NRB blocks, and creates the tables T1 and T2 in steps S5 and S6, respectively.

The intra refresh mode determination unit 24 sequentially performs the processing in steps S1 through S4 in FIG. 6 on the RB blocks and the NRB blocks, and creates the tables T1 and T2 in steps S5 and S6, respectively.

In step S8, the intra refresh mode determination unit 24 selects the mode of the remaining blocks, using the table T2.

The lower half of FIG. 12 shows the states of the blocks before the encoding of the second frame. The lower half of FIG. 12 differs from the lower half of FIG. 8 in that the block a is not a PBr but a PBn, the block b is not a PBr but an IB, and the block c is not a PB but an IB*.

In the example illustrated in FIG. 12, the block a, which was an RB in the previous frame, is not selected at the next timing, and turns into a PBn.

The block b has turned into an RB, but has again turned into an IB and can maintain the RB. Thus, the block b is regarded as a block equal to a PBr. The block c is an IB, but is the 11th IB in a situation where only 10 IBs need to be selected, and is selected with the use of the table T2.

In the second frame, each block is encoded according to the mode selected as described above, and the processing of the second frame is completed.

Like FIG. 9, FIG. 13 is a diagram showing the state after the end of the second frame, which is the states of the blocks before encoding of the third frame.

The blocks that have turned into IBs and PBrs through the encoding of the second frame turn into RBs, and the other blocks turn into NRBs.

The above process is repeated until all the blocks turn into RBs. When all the blocks have turned into RBs, the one set is completed. After that, all the blocks are reset to NRBs, and the process is repeated from the start.

<Example Operation Using Specific Numerical Values>

Next, a method of determining block types using cost values that are numerical values of actual costs is described with reference to a frame formed with 3×3 blocks. The cost values shown below are merely examples.

Of the 3×3 blocks, three blocks turn into RBs for each frame, and one set is completed in three frames. The cost values and the mode selection in each frame for one set are shown for each frame.

Figure 14:
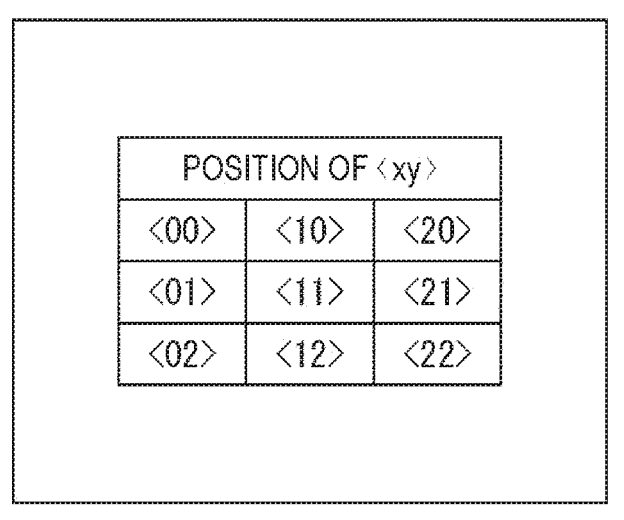

FIG. 14 is a diagram for explaining the positions of the blocks in a frame.

As for <xy> shown in FIG. 14, x is the coordinate in the horizontal direction, and y is the coordinate in the vertical direction. The positions of <xy> are <00>, <10>, and <20> from left to right in the top row. The positions of <xy> are <01>, <11>, and <21> from left to right in the middle row. The positions of <xy> are <02>, <12>, and <22> from left to right in the bottom row.

FIG. 15 is a diagram showing a prev table, cost_IB, and cost_PBn in the zeroth frame.

The prev table shows the states of the blocks after encoding of the previous frame. The cost_IB indicates the costs for the respective blocks to turn into IBs. The cost_PBn indicates the costs for the respective blocks to turn into PBns. Note that the cost_PBr depends on the states (Prev) of the blocks, and therefore, shows the costs from a midway point in the processing.

The prev table shows N or R of the blocks during the period from after the encoding of the previous frame till before the encoding. N indicates an NRB state, and R indicates an RB state. In the initial frame, which is the zeroth frame, all the blocks are N.

In FIG. 15, the cost_IB are <00>=13, <10>=22, <20>=3, <01>=42, <11>=65, <21>=36, <02>=77, <12>=83, and <22>=9. The cost_PBn are <00>=23, <10>=4, <20>=11, <01>=26, <11>=15, <21>=13, <02>=33, <12>=5, and <22>=18.

The intra refresh mode determination unit 24 calculates the table T1 and the table T2 under the assumption that the costs are as shown in FIG. 15. Initially, the cost_PBr holds no values, because the states of all the blocks are N.

FIG. 16 is a diagram showing the table T1 and the table T2 in the zeroth frame.

The table T1 is the table for the blocks to turn into RBs. The table T1 is formed with the costs cost_R of the respective blocks calculated according to an algorithm, and the corresponding mode mode_R. Initially, PBrs holds no values, the entire cost_R in the table T1 is formed with the costs of the cost_IB.

The cost_R are <00>=13, <10>=22, <20>=3, <01>=42, <11>=65, <21>=36, <02>=77, <12>=83, and <22>=9. The mode_R are <00>=IB, <10>=IB, <20>=IB, <01>=IB, <11>=IB, <21>=IB, <02>=IB, <12>=IB, and <22>=IB.

The table T2 is formed with the costs cost_R of the respective blocks calculated according to the algorithm, and the corresponding modes mode_R. The costs cost_N in the table T2 are formed with the minimum values of the cost_IB and the cost_PBn, so as to be the minimum values of all modes.

The cost_N are <00>=13, <10>=4, <20>=3, <01>=26, <11>=15, <21>=13, <02>=33, <12>=5, and <22>=9. The mode_N are <00>=IB, <10>=PBn, <20>=IB, <01>=PBn, <11>=PBn, <21>=PBn, <02>=PBn, <12>=PBn, and <22>=IB.

In FIG. 16, the frame is the zeroth frame, and therefore, three blocks are selected in ascending order from the cost_R in the table T1. In the case illustrated in FIG. 16, <20>=3, <22>=9, and <00>=13 are selected, and the modes of the selected blocks become the modes indicated in the mode_R. That is, <20>=IB, <22>=IB, and <00>=IB. The modes of the remaining blocks are selected from the mode_N. The selected results are the decided_cost and the decided_mode shown in FIG. 17.

FIG. 17 is a diagram showing the decided_cost and the decided_mode in the zeroth frame.

The decided_cost are <00>=13, <10>=4, <20>=3, <01>=26, <11>=15, <21>=13, <02>=33, <12>=5, and <22>=9. The decided_mode are <00>=IB, <10>=PBn, <20>=IB, <01>=PBn, <11>=PBn, <21>=PBn, <02>=PBn, <12>=PBn, and <22>=IB.

The above processing is repeated for three frames on a frame-by-frame basis, and thus, one set is completed.

FIG. 18 is a diagram showing a prev table, cost_IB, cost_PBn, and cost_PBr in the first frame.

In FIG. 18, there are RB blocks in the prev table indicating the state of the previous frame, and accordingly, the costs cost_PBr for the respective blocks to turn into PBrs can be calculated.

In FIG. 18, The prev are <00>=R, <10>=N, <20>=R, <01>=N, <11>=N, <21>=N, <02>=N, <12>=N, and <22>=R. The cost_IB are <00>=10, <10>=2, <20>=13, <01>=32, <11>=55, <21>=76, <02>=7, <12>=53, and <22>=89.

The cost_PBr are <00>=3, <10>=-, <20>=5, <01>=-, <11>=-, <21>=-, <02>=-, <12>=-, and <22>=89. The cost_PBn are <00>=2, <10>=3, <20>=4, <01>=1, <11>=2, <21>=13, <02>=1, <12>=25, and <22>=9.

The intra refresh mode determination unit 24 calculates the table T1 and the table T2 under the assumption that the costs are as shown in FIG. 18, as in the case with the zeroth frame.

FIG. 19 is a diagram showing the table T1 and the table T2 in the first frame.

The cost_R are <00>=3, <10>=2, <20>=5, <01>=32, <11>=55, <21>=76, <02>=7, <12>=53, and <22>=89. The mode_R are <00>=PBr, <10>=IB, <20>=PBr, <01>=IB, <11>=IB, <21>=IB, <02>=IB, <12>=IB, and <22>=PBr.

The cost_N are <00>=2, <10>=2, <20>=4, <01>=1, <11>=2, <21>=13, <02>=1, <12>=25, and <22>=9. The mode_R are <00>=PBn, <10>=IB, <20>=PBn, <01>=PBn, <11>=PBn, <21>=PBn, <02>=PBn, <12>=PBn, and <22>=PBn.

Since the frame is the first frame, six blocks are selected in ascending order from the cost_R in the table T1. Here, <10>=2, <00>=3, <20>=5, <02>=7, <01>=32, and <12>=53 are selected, and the modes of the selected blocks become the modes indicated in the mode_R. That is, <10>=IB, <00>=PBr, <20>=IB, <02>=PBr, <01>=IB, and <12>=IB. The modes of the remaining blocks are selected from the mode_N. The selected results are the decided_cost and the decided_mode shown in FIG. 20.

FIG. 20 is a diagram showing the decided_cost and the decided_mode in the first frame.

The decided_cost are <00>=3, <10>=2, <20>=5, <01>=32, <11>=2, <21>=13, <02>=7, <12>=53, and <22>=9. The decided_mode are <00>=PBr, <10>=IB, <20>=PBr, <01>=IB, <11>=PBn, <21>=PBn, <02>=IB, <12>=IB, and <22>=PBn.

FIG. 21 is a diagram showing a prev table, cost_IB, cost_PBn, and cost_PBr in the second frame, which is the last frame in the set.

In the second frame, selection is performed in a manner similar to that for the selection in the first frame. However, this frame is the last frame, and therefore, all of the blocks need to eventually turn into RBs. In view of this, the calculation for turning blocks into NRBs is not necessary. Although no distinction is made in the algorithm, the calculation is eventually discarded. In FIG. 21, the cost_PBn is shown, but is not used in the end.

In FIG. 21, the prev are <00>=R, <10>=R, <20>=R, <01>=R, <11>=N, <21>=N, <02>=R, <12>=R, and <22>=N. The cost_IB are <00>=11, <10>=3, <20>=14, <01>=30, <11>=50, <21>=70, <02>=1, <12>=13, and <22>=34.

The cost_PBr are <00>=3, <10>=4, <20>=5, <01>=1, <11>=-, <21>=-, <02>=5, <12>=35, and <22>=-. The cost_PBn are <00>=2, <10>=3, <20>=4, <01>=1, <11>=2, <21>=13, <02>=1, <12>=25, and <22>=9.

The intra refresh mode determination unit 24 calculates the table T1 under the assumption that the costs are as shown in FIG. 21, as in the zeroth frame and the first frame.

FIG. 22 is a diagram showing the table T1 and the table T2 in the second frame.

In FIG. 22, the table T2 is also shown, but is not actually used.

The cost_R are <00>=3, <10>=3, <20>=5, <01>=1, <11>=50, <21>=70, <02>=1, <12>=13, and <22>=34. The mode_R are <00>=PBr, <10>=IB, <20>=PBr, <01>=PBr, <11>=IB, <21>=IB, <02>=IB, <12>=IB, and <22>=IB.

The cost_N are <00>=2, <10>=3, <20>=4, <01>=1, <11>=2, <21>=13, <02>=1, <12>=13, and <22>=9. The mode_R are <00>=PBn, <10>=PBn, <20>=PBn, <01>=PBn, <11>=PBn, <21>=PBn, <02>=PBn, <12>=IB, and <22>=PBn.

Because the frame is the last frame in the set, all the blocks are selected from the cost_R. The selected results are the decided_cost and the decided_mode shown in FIG. 23.

FIG. 23 is a diagram showing the decided_cost and the decided_mode in the second frame.

The decided_cost are <00>=3, <10>=3, <20>=5, <01>=1, <11>=50, <21>=70, <02>=1, <12>=13, and <22>=34. The decided_mode are <00>=PBr, <10>=IB, <20>=PBr, <01>=PBr, <11>=IB, <21>=IB, <02>=IB, <12>=IB, and <22>=IB.

The above is the flow in one set of refresh operations.

Particular cases also appear in examples using specific cost values. At the end of the first frame, <22> in the decided_mode is PBn. The initial state of the block <22> is RB. As a result, a block that has once turned into an RB again turns into an NRB, because of the cost value. The number of RBs is six in total when IBs and PBr are added, which shows a correct increase.

As described above, in the present technology, it is possible to select a mode capable of realizing a function at a minimum cost through cost calculation, regardless of positional restrictions such as maintaining an IB area.

Next, a frame encoding process to be performed by the encoding device 11 in FIG. 2 is described with reference to the flowchart in FIG. 24.

In step S11, the intra refresh mode determination unit 24 sets initial values. In the initialization value settings, the value indicating the total number of blocks in the frame is set as the value of Total_Block (Total_Block: =the total number of blocks in the frame). Also, the value indicating the number of blocks to be refreshed at one time is set as the value of n (n:=the number of blocks to be refreshed at once).

In step S12, the buffer 21 reads and stores a frame input as an encoding target.

In step S13, the buffer 21 rearranges the images on a frame-by-frame basis stored in the display order into images in the encoding order according to the GOP structure. The buffer 21 outputs the rearranged images to the arithmetic operation unit 25, the addition unit 30, the intra prediction unit 33, and the motion compensation unit 34.

In step S14, the images stored in the buffer 21 are analyzed, and information indicating the analysis result is supplied to the rate control unit 23 and the intra refresh mode determination unit 24.

In step S15, the rate control unit 23 and the intra refresh mode determination unit 24 determine a quantization value through rate control.

In step S16, intra-frame mode determination and an encoding process are performed. The intra-frame mode determination and the encoding process will be described later in detail, with reference to the flowchart shown in FIG. 25. The quantization value quantized by the orthogonal transform/quantization unit 26 through the intra-frame mode determination and the encoding process is supplied to the entropy encoding unit 27.

In step S17, the entropy encoding unit 27 performs lossless encoding on the quantization value quantized by the orthogonal transform/quantization unit 26. Coded data is generated from the quantization value subjected to the lossless encoding, and the generated coded data is supplied to the buffer 28.

In step S18, the buffer 28 temporarily stores the coded data encoded by the entropy encoding unit 27, and outputs the coded data as a bit stream at a predetermined timing.

In step S19, the intra refresh mode determination unit 24 determines whether or not the processing target frame is the last frame. If the target frame is determined not to be the last frame in step S19, the process returns to step S12, and the processing thereafter is repeated.

Figure 24:
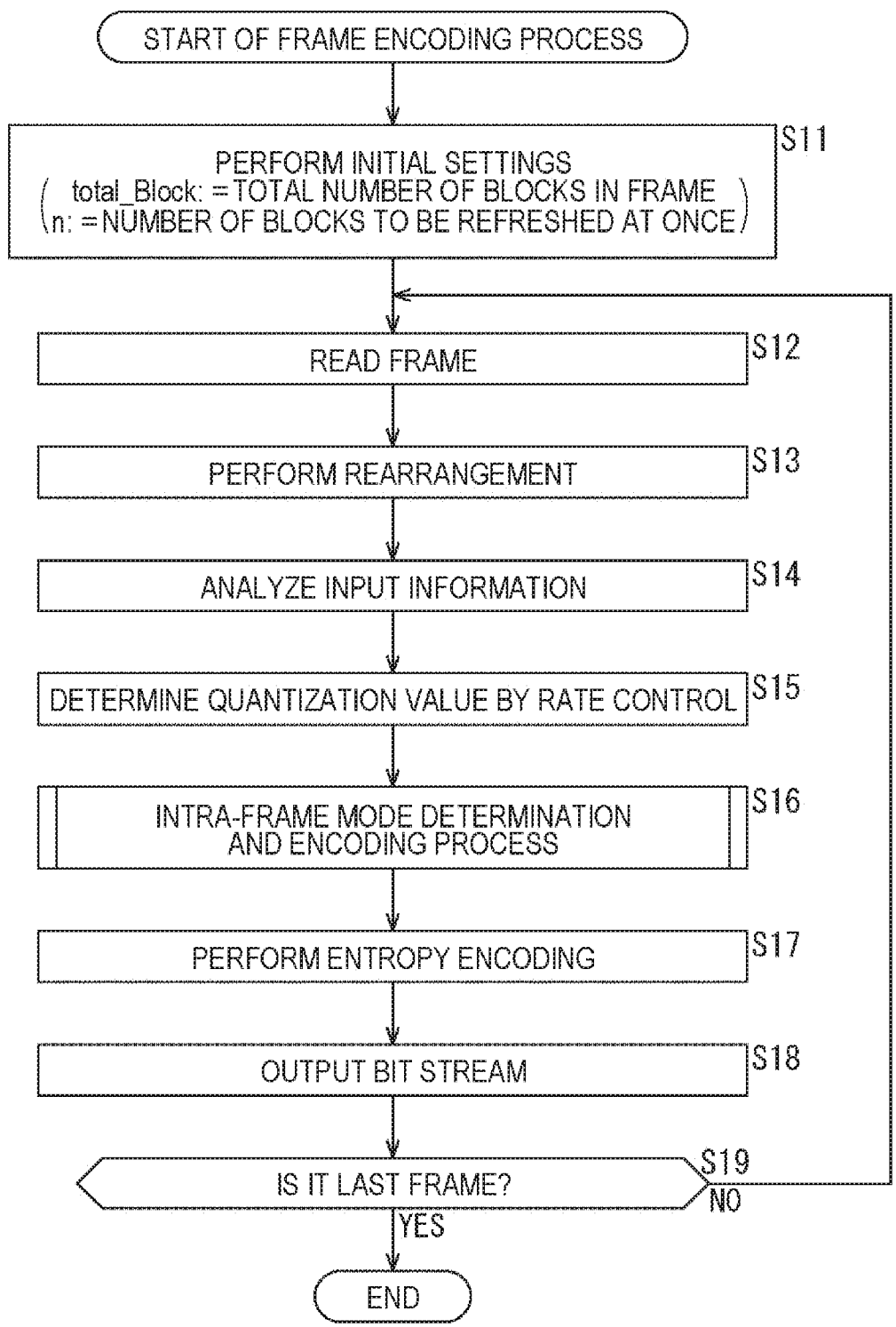
FIG. 24 is a flowchart for explaining an encoding process to be performed by the encoding device shown in FIG. 2.

If the target frame is determined to be the last frame in step S19, the frame encoding process in FIG. 24 comes to an end.

Next, the intra-frame mode determination and the encoding process in step S16 in FIG. 24 is described with reference to the flowchart shown in FIG. 25.

In step S31, the intra refresh mode determination unit 24 determines whether or not the processing target frame is the initial frame. If the target frame is determined to be the initial frame in step S31, the process moves on to step S32.

In step S32, the intra refresh mode determination unit 24 sets the value of the total number N of RBs to 0 (N: =0).

In step S33, the intra refresh mode determination unit 24 sets the modes of all the blocks to an intra mode. That is, the initial frame is processed as an intra frame, and the process moves on to step S38.

If the target frame is determined not to be the initial frame in step S31, on the other hand, the process moves on to step S34.

In step S34, the intra refresh mode determination unit 24 determines whether or not N is 0. If N is determined to be 0 in step S34, the process moves on to step S35. In step S35, the intra refresh mode determination unit 24 sets the modes of all the blocks to NRB (block_mode [all block]: =NRB).

If N is determined not to be 0 in step S34, step S35 is skipped, and the process moves on to step S36.

In step S36, the intra refresh mode determination unit 24 performs a cost generation process for each block in the frame. The cost generation process for each block in the frame will be described later in detail, with reference to FIG. 26. By the processing in step S36, table_RB_cost and table_RB_mode, which are the table T1 formed with the costs of the candidates for RBs or the costs for maintaining RBs, are created, and table_NRB_cost and table_NRB_mode, which are the table T2 formed with the minimum costs among the costs of all the modes, are created.

In step S37, the intra refresh mode determination unit 24 performs a mode determination process for each block in the frame. The mode determination process for each block in the frame will be described later in detail, with reference to FIG. 27. By the processing in step S37, the modes of the blocks to be RBs and the modes of the blocks to be NRBs are determined.

In step S38, an encoding process is performed. The encoding process will be described later in detail with reference to FIG. 28. By the processing in step S38, a predicted image is subtracted from the original image and is subjected to deblocking filtering, and the image is stored into the frame memory 32 for the use in the next frame.

In step S39, the intra refresh mode determination unit 24 sets the value of N at a value obtained by adding n, which is the number of RBs to be added for each frame, to N (N: =N+n).

In step S40, the intra refresh mode determination unit 24 determines whether or not N is greater than the total_block, which is the total number of blocks in the frame.

If N is determined to be greater than the total_block in step S40, the process moves on to step S41. In step S41, the intra refresh mode determination unit 24 sets the value of N to (N: =0).

Figure 25:
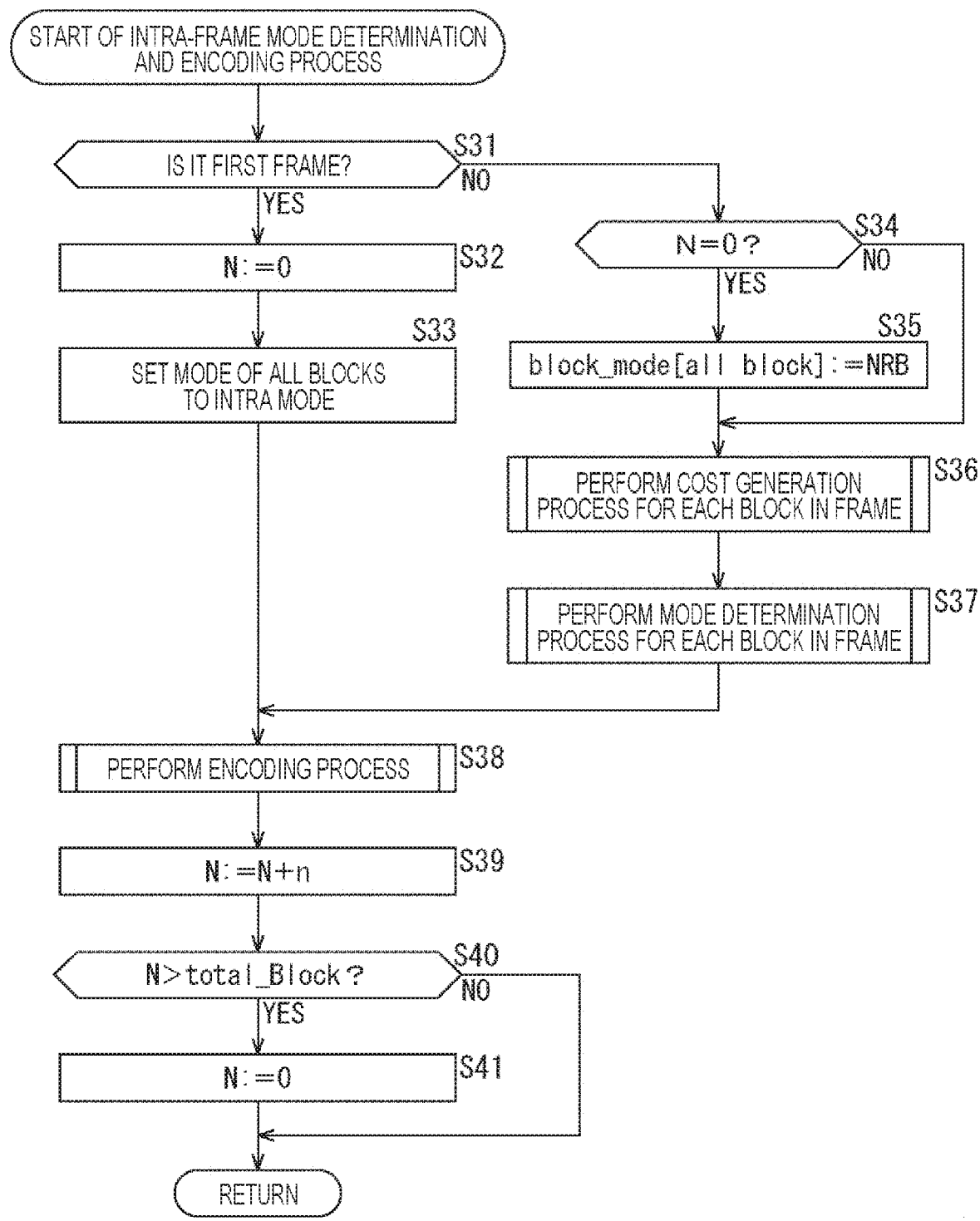
FIG. 25 is a flowchart for explaining intra-frame mode determination and an encoding process in step S16 in FIG. 24.

If N is determined to be smaller than the total_block in step S40, the processing in step S41 is skipped, and the intra-frame mode determination and the encoding process in FIG. 25 come to an end.

Next, the cost generation process for each block in the frame in step S36 in FIG. 25 is described with reference to the flowchart shown in FIG. 26.

In step S61, the intra refresh mode determination unit 24 sets the value of blk indicating the number of blocks to 0 (blk: =0).

In step S62, the intra prediction unit 33 performs intra (IB) prediction calculation.

The intra prediction unit 33 performs intra prediction calculation, supplies the predicted image generated in the optimum intra mode to the selector 35, and supplies the intra mode information and the corresponding cost to the intra refresh mode determination unit 24.

In step S63, the motion compensation unit 34 performs inter (PBr, PBn) prediction calculation.

The motion compensation unit 34 performs inter prediction calculation, and supplies the predicted image generated in the optimum inter mode to the selector 35. The inter mode information and the corresponding cost are supplied to the intra refresh mode determination unit 24.

In step S64, the intra refresh mode determination unit 24 sets Cost_IB to the cost for turning a block into an IB (Cost_IB: =the cost for transition to an IB), sets Cost_PBr to the cost for turning a block into a PBr (Cost_PBr: =the cost for transition to a PBr), and sets Cost_PBn to the cost for turning a block into a PBn (Cost_PBn: =the cost for transition to a PBn).

In step S65, the intra refresh mode determination unit 24 determines whether the block with a block number (blk) was an RB or was an NRB in the past frame (block_mode [blk]?). If the block of blk is determined to have been an RB in the past frame in step S65, the process moves on to step S66.

In step S66, the intra refresh mode determination unit 24 sets Cost_IB to the value of Cost_RB (Cost_RB: =Cost_IB), and sets IB to Mode_RB (Mode_RB: ="IB"). After that, the process moves on to step S68.

If the block of blk=0 is determined to have been an NRB in the past frame in step S65, the process moves on to step S67.

In step S67, the intra refresh mode determination unit 24 sets Cost_RB, which is the cost of an RB, to the smaller one of Cost_IB and Cost_PBr (Cost_RB: =min(Cost_IB, Cost_PBr)). The intra refresh mode determination unit 24 also sets Mode_RB, which is the mode of an RB, to the mode corresponding to the smaller one of Cost_IB and Cost_PBr (Mode_RB: =getmode (min(Cost_IB, Cost_PBr))). After that, the process moves on to step S68.

In step S68, the intra refresh mode determination unit 24 sets Cost_NRB, which is the cost of an NRB, to the smallest one of Cost_IB, Cost_PBr, and Cost_PBn (Cost_NRB: =min(Cost_IB, Cost_PBr, Cost_PBn)). The intra refresh mode determination unit 24 also sets Mode_NRB, which is the mode of an NRM, the mode corresponding to the smallest one of Cost_IB, Cost_PBr, and Cost_PBn (Mode_NRB: =getmode (min(Cost_IB, Cost_PBr, Cost_PBn))).

In step S69, the intra refresh mode determination unit 24 sets Cost_RB to table_RB_cost [blk], which is the RB_cost table for the block of blk (table_RB_cost [blk]: =Cost_RB), and sets Mode_RB to table_RB_mode [blk], which is the RB mode table for the block of blk block (table_RB_mode [blk]: =Mode_RB). The intra refresh mode determination unit 24 also sets Cost_NRB to table_NRB_cost [blk], which is the NRB cost table for the block of blk (table_NRB_cost [blk]: =Cost_NRB), and sets Mode_NRB to table_NRB_mode [blk], which is the NRB mode table for the block of blk block (table_NRB_mode [blk]: =Mode_NRB).

In step S70, the intra refresh mode determination unit 24 adds 1 to the value of blk (blk: =blk+1).

In step S71, the intra refresh mode determination unit 24 determines whether or not blk is smaller than total_Block, which is the total number of blocks in the frame. If blk is determined to be smaller than total_Block in step S71, the process returns to step S62, and the processing thereafter is repeated.

Figure 26:
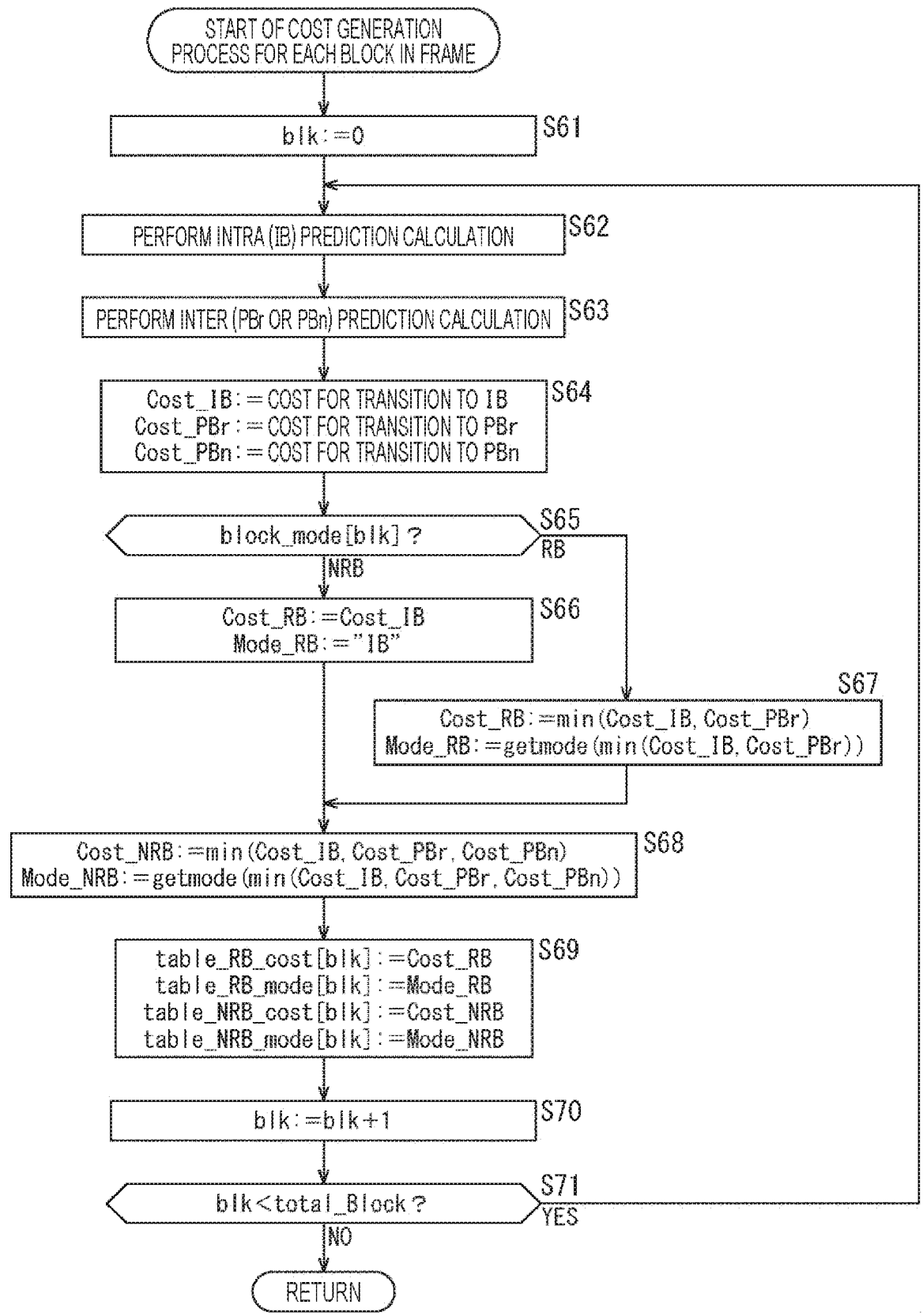
FIG. 26 is a diagram for explaining a cost creation process in step S36 in FIG. 25 for each block in a frame.

If blk is determined to be greater than total_Block in step S71, the cost generation process for each block in the frame shown in FIG. 26 comes to an end.

Figure 27:
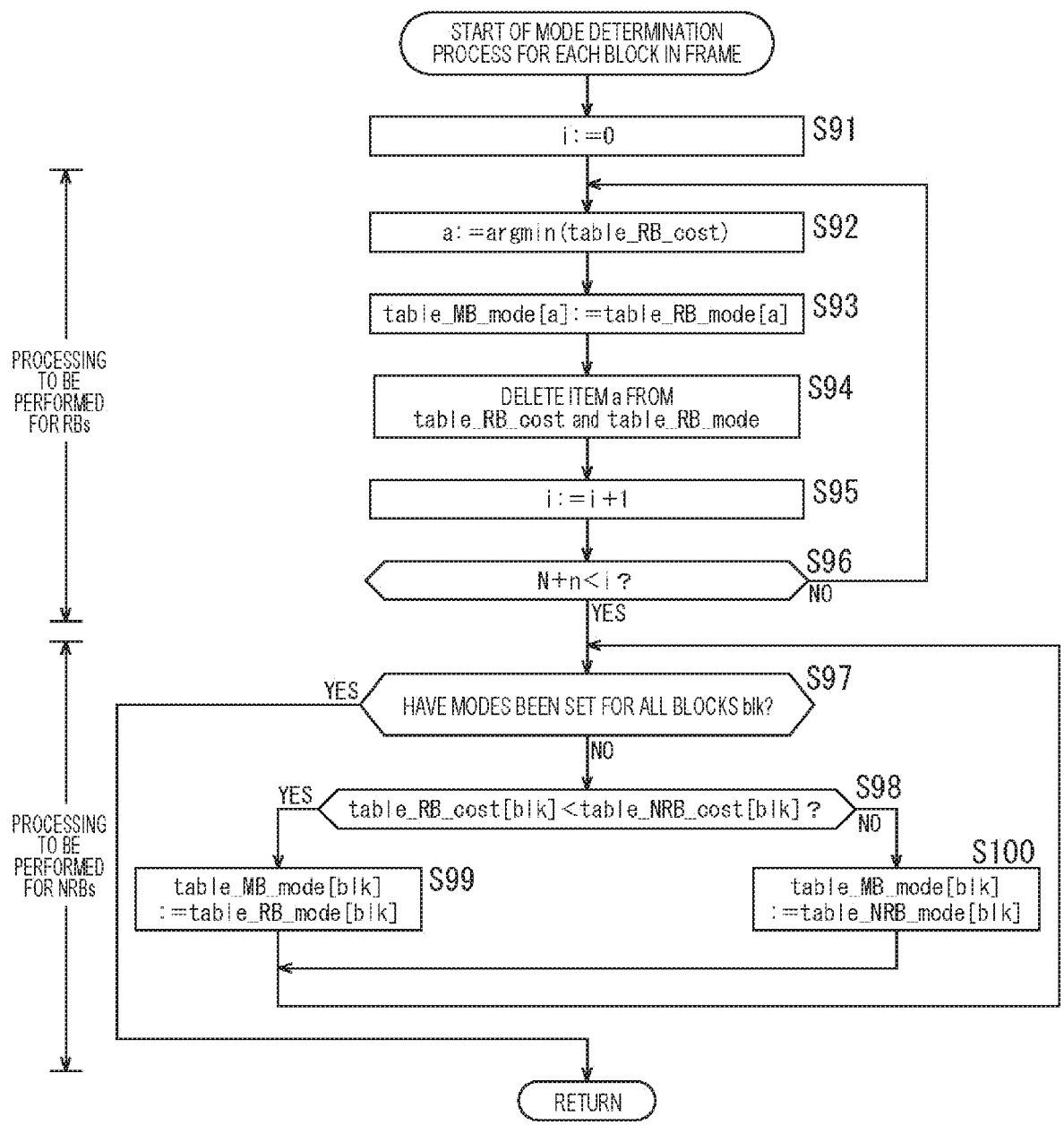
FIG. 27 is a flowchart for explaining a mode determination process in step S37 in FIG. 25 for each block in a frame.

Next, the mode determination process for each block in the frame in step S37 in FIG. 25 is described with reference to the flowchart shown in FIG. 27. Note that steps S92 through S96 in FIG. 27 are the processing to be performed for RBs, and steps S97 through S100 are the processing to be performed for NRBs.

In step S91, the intra refresh mode determination unit 24 sets the value of i to 1 (i: =0). In step S92, the value of a is set to the value of argmin(table_RB_cost) indicating the position of the minimum value found in a table (table_RB_cost).

In step S93, the intra refresh mode determination unit 24 sets the value of table_RB_mode [a], which is the RB mode table, to table_MB_mode [a], which is a block_mode table (table_MB_mode [a]: =table_RB_mode [a]).

In step S94, the intra refresh mode determination unit 24 deletes "a" from table_RB_cost and table_RB_mode.

In step S95, the intra refresh mode determination unit 24 adds 1 to i (i: =i+1). In step S96, the intra refresh mode determination unit 24 determines whether or not i is greater than N+n. If i is determined to be equal to or smaller than N+n in step S96, the process returns to step S92, and the processing thereafter is repeated.

If i is determined to be greater than N+n in step S96, the process moves on to step S97.

In step S97, the intra refresh mode determination unit 24 determines whether or not modes have been set for all the blocks blk. If it is determined in step S97 that modes have been set for all the blocks blk, the mode determination process for each block in the frame shown in FIG. 27 comes to an end.

If it is determined in step S97 that modes have not been set for all the blocks blk, the process moves on to step S98.

In step S98, the intra refresh mode determination unit 24 determines whether or not table_RB_cost [blk], which is the value of a block in the RB_cost table, is smaller than table_NRB_cost [blk], which is the value of a block in the NRB cost table.

If table_RB_cost [blk] is determined to be smaller than table_NBR_cost [blk] in step S98, the process moves on to step S99.

In step S99, the intra refresh mode determination unit 24 sets the value table_RB_mode [blk] of the RB mode table to the value table_MB_mode [blk] of the block_mode table (table_MB_mode [blk]: =table_RB_mode [blk]).

If table_RB_cost [blk] is determined to be equal to or greater than table_NBR_cost [blk] in step S98, the process moves on to step S100.

In step S100, the intra refresh mode determination unit 24 sets the value table_NRB_mode [blk] of the NRB mode table to the value table_MB_mode [blk] of the block_mode table (table_MB_mode [blk]: =table_NRB_mode [blk]).

After step S99 or S100, the process returns to step S97, and the processing thereafter is repeated.

Figure 28:
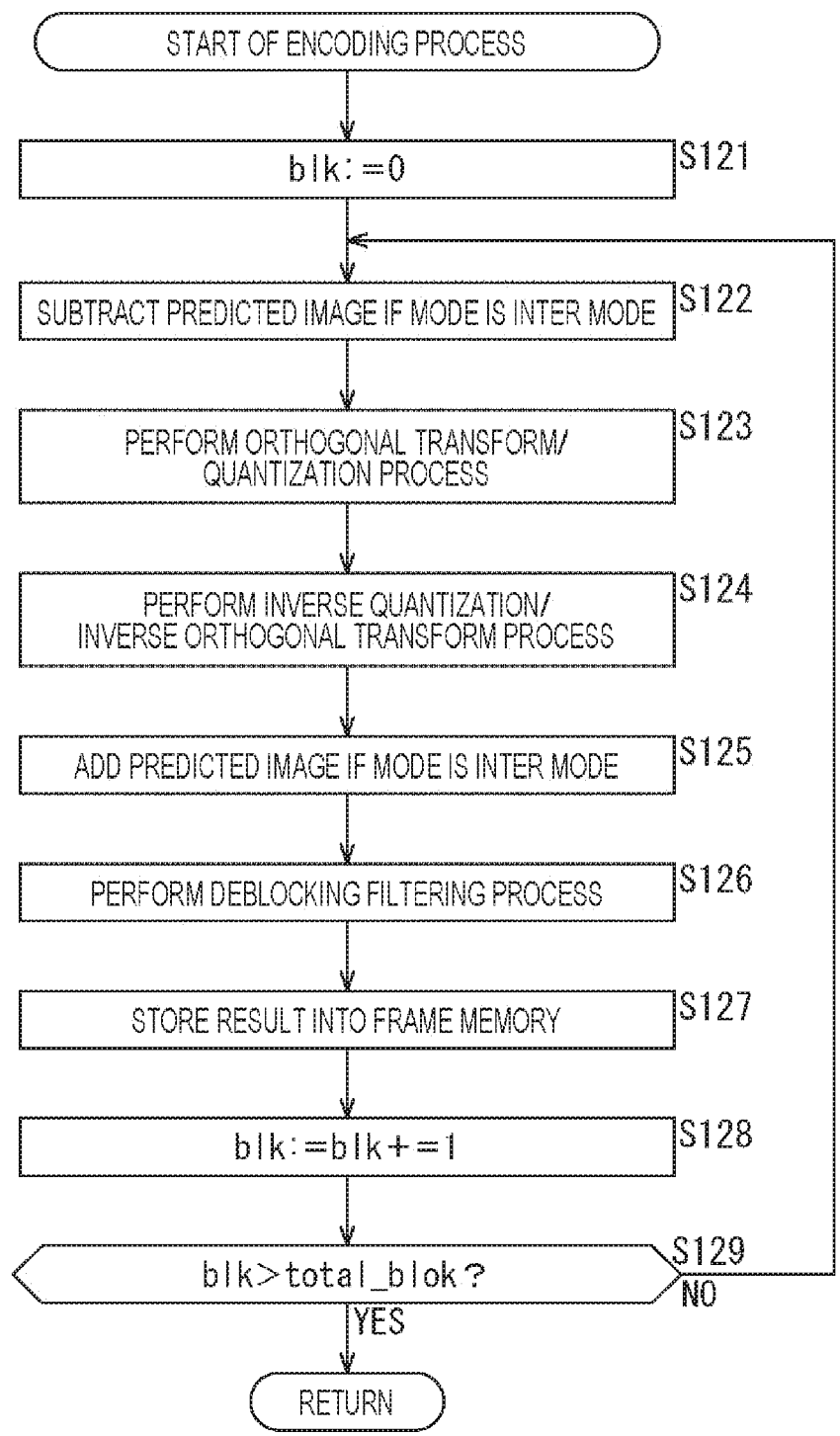
FIG. 28 is a flowchart for explaining an encoding process in step S36 in FIG. 25.

Next, the encoding process in step S38 in FIG. 25 is described with reference to the flowchart shown in FIG. 28.

A mode is selected in step S37 in FIG. 25, and intra/inter selection information is supplied to the selector 35. The selector 35 supplies the predicted image according to the intra/inter selection information to the arithmetic operation unit 25.

In step S121, the intra refresh mode determination unit 24 sets blk: =0. In step S122, if the selected mode is an inter mode, the arithmetic operation unit 25 subtracts the predicted image from the original image. If the selected mode is an intra mode, the original image is output without any change.

In step S123, the orthogonal transform/quantization unit 26 performs an orthogonal transform process on the information supplied from the arithmetic operation unit 25. The orthogonal transform/quantization unit 26 quantizes the result of the orthogonal transform process. The orthogonal transform/quantization unit 26 supplies the quantization value obtained as a result of the quantization to the entropy encoding unit 27 and the inverse quantization/inverse orthogonal transform unit 29.

In step S124, the inverse quantization/inverse orthogonal transform unit 29 performs inverse quantization on the quantization value quantized by the orthogonal transform/quantization unit 26. The inverse quantization/inverse orthogonal transform unit 29 supplies the orthogonal transform process result obtained as a result of the inverse quantization, to the addition unit 30.

In step S125, if the selected mode is an inter mode, the addition unit 30 adds the image (predicted image) obtained as a result of the inverse orthogonal transform performed by the inverse quantization/inverse orthogonal transform unit 29, to the image supplied from the buffer 21. The addition unit 30 supplies the combined image to the deblocking filter 31. If the selected mode is an intra mode, the image stored in the buffer 21 is supplied to the deblocking filter 31.

In step S126, the deblocking filter 31 performs a deblocking filtering process on the image combined by the addition unit 30.

In step S127, the deblocking filter 31 supplies the resultant image to the frame memory 32. The image stored in the frame memory 32 is output as the reference image to the motion compensation unit 34.

In step S128, the intra refresh mode determination unit 24 adds 1 to the value of blk (blk: =blk+1).

In step S129, the intra refresh mode determination unit 24 determines whether or not blk is greater than total_Block. If blk is determined to be smaller than total_Block in step S129, the process returns to step S122, and the processing thereafter is repeated.

If blk is determined to be greater than total_Block in step S129, the encoding process comes to an end.

As described above, according to the present technology, it is possible to completely recover from an error, without insertion of an intra frame with a large generation amount in the middle of a sequence.

According to the present technology, the amount of generation of each frame is equalized, to distribute intra blocks in each frame. As a result, it is possible to reduce unevenness timewise, and shorten delays.

According to the present technology, intra blocks for refresh can be arranged at random. Thus, those intra blocks can be made visually inconspicuous, and subjective image quality can be enhanced.

According to the present technology, selection of the encoding mode of a block is not subject to any static shape restriction, and thus, an increase in compression efficiency can be expected.

Further, according to the present technology, the refresh intervals can be selected relatively freely.

<Example Configuration of a Decoding Device>

Figure 29:
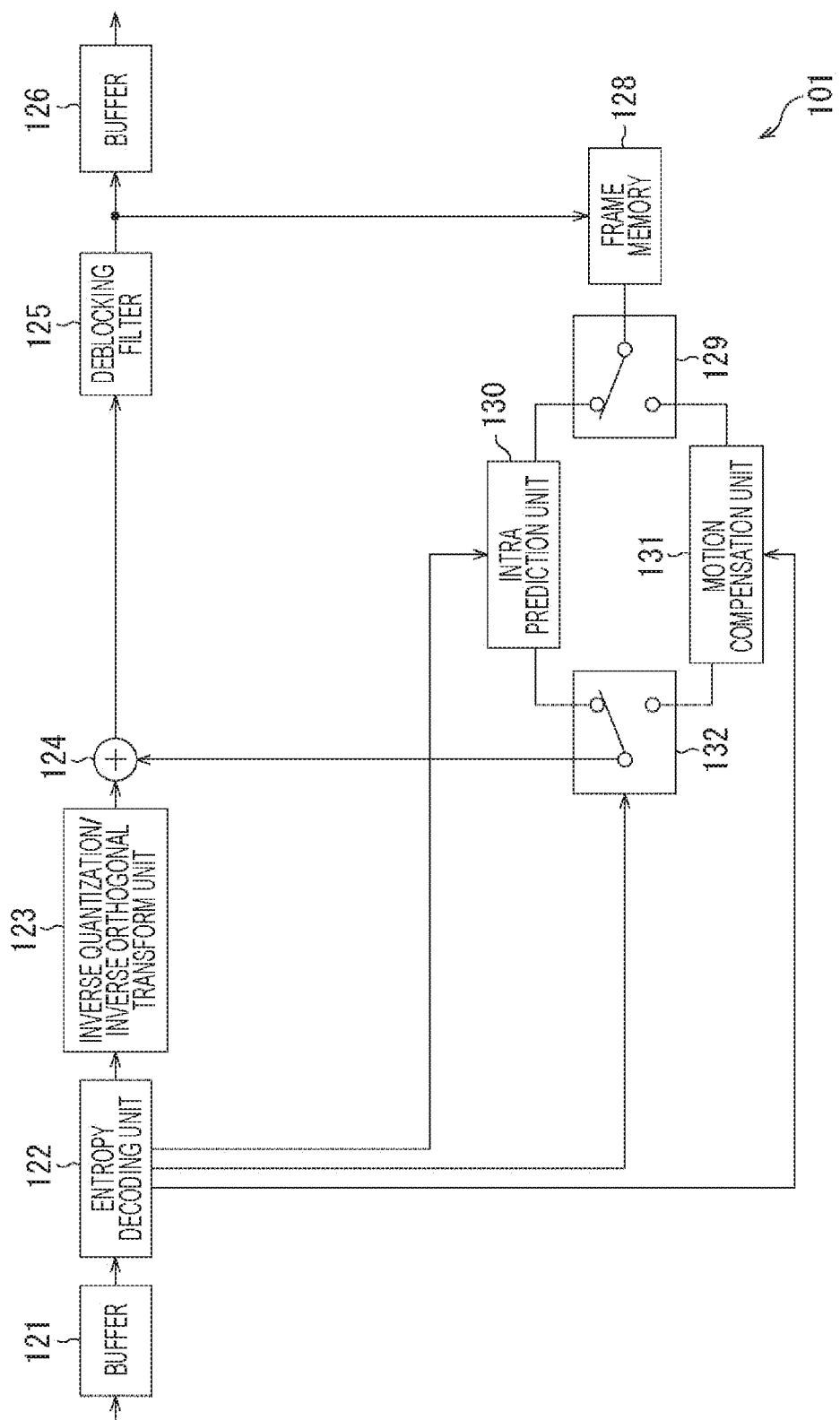
FIG. 29 is a block diagram showing an example configuration of an embodiment of a decoding device to which the present disclosure is applied.

FIG. 29 is a block diagram showing an example configuration of an embodiment of a decoding device to which the present disclosure is applied. Note that a bit stream generated and transmitted by the encoding device 11 shown in FIG. 2 according to the present technology is a bit stream that requires no special decoding processes. Therefore, the configuration of the decoding device in FIG. 29 is an example configuration of a general decoding device.

A decoding device 101 decodes a bit stream transmitted from the encoding device 11 shown in FIG. 2.

The decoding device 101 shown in FIG. 29 includes a buffer 121, an entropy decoding unit 122, an inverse quantization/inverse orthogonal transform unit 123, an addition unit 124, a deblocking filter 125, and a buffer 126. The decoding device 101 also includes a frame memory 128, a switch 129, an intra prediction unit 130, a motion compensation unit 131, and a switch 132.

The buffer 121 of the decoding device 101 receives and stores coded data included in a bit stream transmitted from the encoding device. The buffer 121 supplies the stored coded data to the entropy decoding unit 122.

The entropy decoding unit 122 performs lossless decoding, such as variable-length decoding or arithmetic decoding, on the coded data supplied from the buffer 121, and thus, obtains the quantization value and encoding information The entropy decoding unit 122 supplies the quantization value to the inverse quantization/inverse orthogonal transform unit 123 The entropy decoding unit 122 also supplies intra mode information and the like as the encoding information to the intra prediction unit 130. The entropy decoding unit 122 supplies the motion compensation unit 131 with the motion vector, inter mode information, information for identifying a reference image, and the like.

The entropy decoding unit 122 further supplies intra or inter mode information as the encoding information to the switch 132.

The inverse quantization/inverse orthogonal transform unit 123, the addition unit 124, the deblocking filter 125, the frame memory 128, the intra prediction unit 130, and the motion compensation unit 131 perform operations similar to those performed by the inverse quantization/inverse orthogonal transform unit 29, the addition unit 30, the deblocking filter 31, the frame memory 32, the intra prediction unit 33, and the motion compensation unit 34 shown in FIG. 2, respectively, to decode images.

Specifically, the inverse quantization/inverse orthogonal transform unit 123 is designed like the inverse quantization/inverse orthogonal transform unit 29 shown in FIG. 2. The inverse quantization/inverse orthogonal transform unit 123 inversely quantizes the quantization value obtained as a result of a decoding process. The inverse quantization/inverse orthogonal transform unit 123 supplies the information obtained as a result of the inverse orthogonal transform process to the addition unit 124.

The addition unit 124 adds the information obtained as a result of the inverse orthogonal transform process performed by the inverse quantization/inverse orthogonal transform unit 123 to a predicted image supplied from the switch 132. The addition unit 124 supplies the image resulting from the addition to the deblocking filter 125.

The deblocking filter 125 performs an adaptive deblocking filtering process on the image resulting from the addition performed by the addition unit 124, and supplies the resulting image to the frame memory 128 and the buffer 126.

The buffer 126 stores, frame by frame, the image subjected to the adaptive deblocking filtering process by the deblocking filter 125. The buffer 126 rearranges the stored frame-by-frame image in the order for encoding into the original display order, and outputs the rearranged image to a subsequent stage (not shown).

The frame memory 128 stores the image on which the deblocking filter 125 has performed the adaptive deblocking filtering process. Meanwhile, an image that is stored in the frame memory 128 and has been subjected to a filtering process is output as a reference image to the motion compensation unit 131 via the switch 129.

Using a peripheral image that has been read from the frame memory 128 via the switch 129, the intra prediction unit 130 performs an intra prediction process in the optimum intra mode indicated by the intra mode information supplied from the entropy decoding unit 122. The intra prediction unit 130 supplies the resultant predicted image to the switch 132.

From the frame memory 128 via the switch 129, the motion compensation unit 131 reads the reference image identified by the information supplied from the entropy decoding unit 122 for identifying the reference image. Using the motion vector and the reference image supplied from the entropy decoding unit 122, the motion compensation unit 131 performs a motion compensation process in the optimum inter mode indicated by the inter mode information supplied from the entropy decoding unit 122. The motion compensation unit 131 supplies the predicted image generated as a result of the motion compensation process to the switch 132.

In a case where intra mode information is supplied from the entropy decoding unit 122, the switch 132 supplies the predicted image supplied from the intra prediction unit 130, to the addition unit 124. In a case where inter mode information is supplied from the entropy decoding unit 122, on the other hand, the switch 132 supplies the image predicted by the motion compensation unit 131 to the addition unit 124.

<Description of Processes to be Performed by the Decoding Device>

Figure 30:
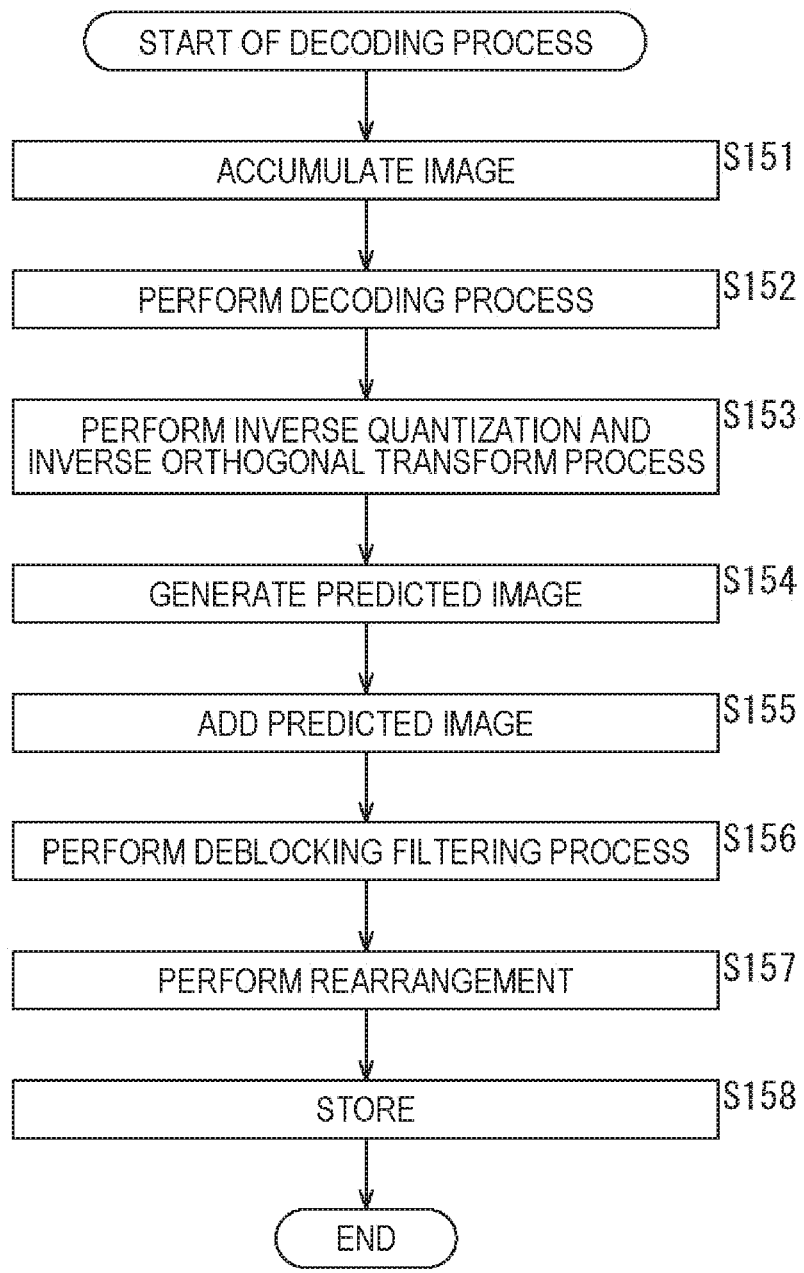
FIG. 30 is a flowchart for explaining a decoding process to be performed by the decoding device shown in FIG. 28.

Next, a decoding process to be performed by the decoding device 101 is described in detail, with reference to the flowchart in FIG. 30.

When a decoding process is started, the buffer 121 in step S151 stores the coded data to be supplied to the decoding device 101. In step S152, the entropy decoding unit 122 performs a decoding process, to obtain quantized data.

In step S153, the inverse quantization/inverse orthogonal transform unit 123 inversely quantizes the quantized data obtained through the processing in step S152, to obtain an orthogonal transform coefficient. The inverse quantization/inverse orthogonal transform unit 123 performs inverse orthogonal transform on the orthogonal transform coefficient, to obtain a restored image.

In step S154, the intra prediction unit 130, the motion compensation unit 131, and the switch 132 perform a prediction process in the mode used in the encoding, to generate a predicted image.

In step S155, the addition unit 124 adds the predicted image obtained through the processing in step S154 to the restored image obtained through the processing in step S151, to obtain a reconstructed image.

In step S156, the deblocking filter 125 performs a filtering process such as deblocking filtering on the reconstructed image obtained through the processing in step S155, to obtain a decoded image.

In step S157, the buffer 126 performs rearrangement on the decoded image obtained through the processing in step S156, to rearrange the frames in the original displaying order (the order before the buffer 21 of the encoding device 11 performs the rearrangement).

In step S158, the frame memory 128 stores the decoded image obtained through the processing in step S157. The stored decoded image is used as the reference image in inter prediction.

When the processing in step S156 is completed, the image decoding process comes to an end.

Note that the units of processing in these processes may be any units, and are not necessarily the same as one another. Accordingly, the processing in each step may be performed in parallel with the processing or the like in another step, or the sequence of the processing may be changed.

<Data Unit for Information>

Each of the units of data (or target data) for setting the information relating to images and the information relating to encoding/decoding of images described above may be any appropriate unit, and is not limited to the above example. For example, these pieces of information may be set for each TU, PU, CU, LCU, sub-block, block, tile, slice, picture, sequence, or component, or may be directed to data of any of these data units. The data unit is of course set for each piece of information. That is, there is no need to set (or direct) all the information for each identical data unit. Note that these pieces of information may be stored at any location, and may be stored in the above described header of a data unit, a parameter set, or the like. Alternatively, the information may be stored at a plurality of locations.

<Encoding/Decoding>

Note that the present disclosure can be applied to image encoding devices and image decoding devices that are used when image information (bit streams) compressed through orthogonal transform such as discrete cosine transform and motion compensation is received via a network medium such as satellite broadcasting, cable television, the Internet, or a portable telephone apparatus, as in HEVC or the like, for example. The present disclosure can also be applied to image encoding devices and image decoding devices that are used when compressed image information is processed on a storage medium such as an optical or magnetic disk or a flash memory.

<Fields of Application of the Present Technology>

A system, an apparatus, a processing unit, and the like to which the present technology is applied can be used in any appropriate field such as transportation, medical care, crime prevention, agriculture, the livestock industry, mining, beauty care, factories, household appliances, meteorology, or nature observation, for example.

For example, the present technology can be applied to a system or a device that transmits an image provided for viewing. The present technology can also be applied to a system or a device to be used in transportation, for example. Further, the present technology can be applied to a system or a device to be used for security, for example. The present technology can also be applied to a system or a device to be used in sports, for example. Further, the present technology can be applied to a system or a device to be used in agriculture, for example. The present technology can also be applied to a system or a device to be used in the livestock industry, for example. Further, the present technology can also be applied to a system or a device that monitors nature conditions such as volcanoes, forests, or the ocean, for example. The present technology can also be applied to a meteorological observation system or a meteorological observation device that observes weather, temperature, humidity, wind velocity, sunlight hours, and the like, for example. Further, the present technology can be applied to a system, a device, or the like that observes the ecology of wildlife such as birds, fish, reptiles, amphibians, mammals, insects, or plants, for example.

<Application to a Multiview Image Encoding/Decoding System>

The series of processes described above can be applied to a multiview image encoding/decoding system that performs encoding/decoding of a multiview image including images of a plurality of viewpoints (views). In that case, the present technology is applied to encoding/decoding of each viewpoint (view).

<Application to a Hierarchical Image Encoding/Decoding System>

The series of processes described above can also be applied to a hierarchical image encoding (scalable coding)/ decoding system that performs encoding/decoding of a hierarchical image that is multi-layered (hierarchized) so as to have a scalability function with respect to a predetermined parameter. In that case, the present technology is applied to encoding/decoding of each hierarchical layer (layer).

<Computer>

The above described series of processes can be performed by hardware or can be performed by software. In a case where the series of processes are to be performed by software, the program that forms the software is installed into a computer. Here, the computer may be a computer incorporated into special-purpose hardware, or may be a general-purpose personal computer or the like that can execute various kinds of functions when various kinds of programs are installed thereinto, for example.

Figure 31:
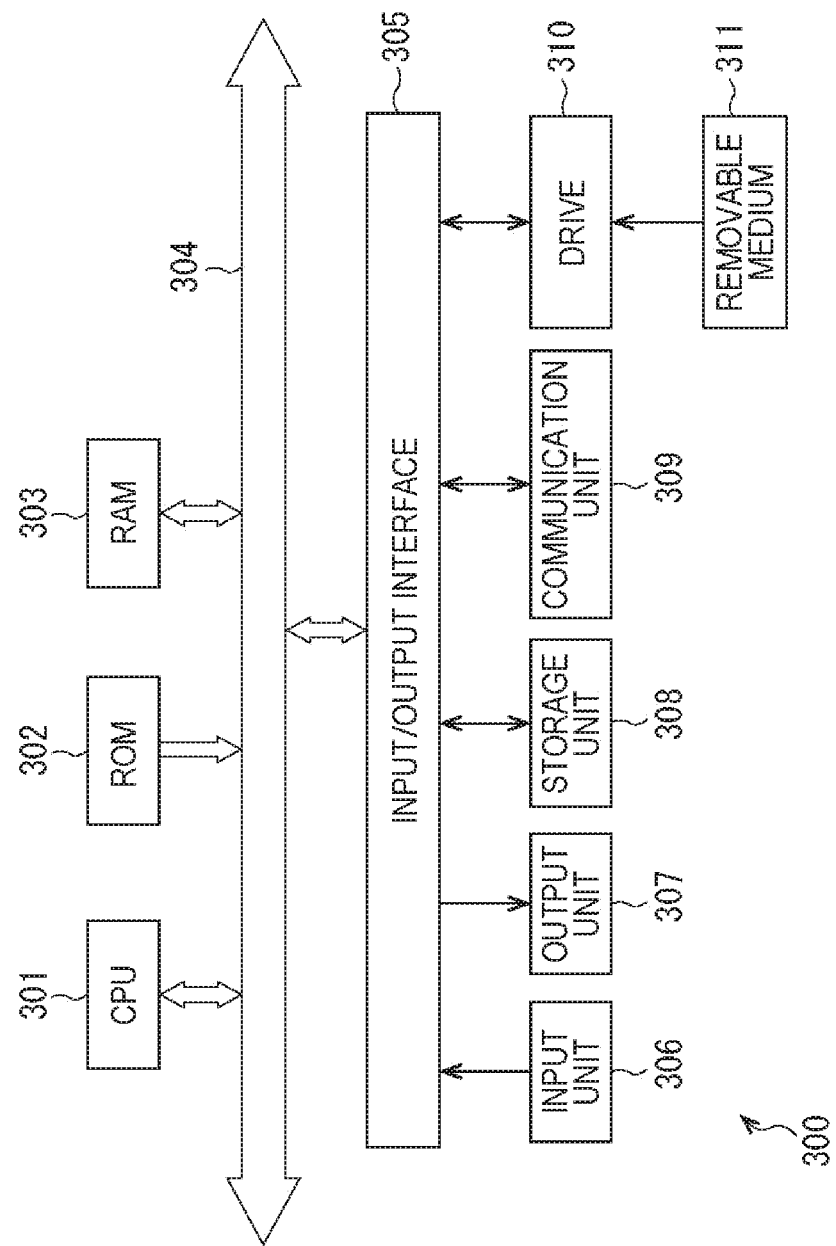
FIG. 31 is a block diagram showing a principal example configuration of a computer.

FIG. 31 is a block diagram showing an example configuration of the hardware of a computer that performs the above described series of processes in accordance with a program.

In a computer 300 shown in FIG. 31, a central processing unit (CPU) 301, a read only memory (ROM) 302, and a random access memory (RAM) 303 are connected to one another by a bus 304.

An input/output interface 305 is also connected to the bus 304. An input unit 306, an output unit 307, a storage unit 308, a communication unit 309, and a drive 310 are connected to the input/output interface 305. Note that a dedicated hardware computing unit for decoding may be added to the bus 304.

The input unit 306 is formed with a keyboard, a mouse, a microphone, a touch panel, an input terminal, and the like, for example. The output unit 307 is formed with a display, a speaker, an output terminal, and the like, for example. The storage unit 308 is formed with a hard disk, a RAM disk, a nonvolatile memory, and the like, for example. The communication unit 309 is formed with a network interface, for example. The drive 310 drives a removable medium 311 such as a magnetic disk, an optical disk, a magnetooptical disk, or a semiconductor memory.

In the computer having the above described configuration, the CPU 301 loads a program stored in the storage unit 313 into the RAM 303 via the input/output interface 305 and the bus 304, for example, and executes the program, so that the above described series of processes is performed. The RAM 303 also stores data necessary for the CPU 801 to perform various processes and the like as appropriate.

The program to be executed by the computer (the CPU 301) may be recorded on the removable medium 311 as a packaged medium or the like to be used, for example. In that case, the program can be installed into the storage unit 308 via the input/output interface 305 when the removable medium 311 is mounted on the drive 310.

Alternatively, the program can also be provided via a wired or wireless transmission medium, such as a local area network, the Internet, or digital satellite broadcasting. In that case, the program may be received by the communication unit 309, and be installed into the storage unit 308.

Other than the above, the program may be installed beforehand into the ROM 302 or the storage unit 308.

<Other Aspects>

Note that various kinds of information relating to coded data (bit streams) may be multiplexed with the coded data and be then transmitted or recorded, or may be transmitted or recorded as separate data associated with the coded data without being multiplexed with the coded data. Here, the term "to associate" means to enable use of other data (or a link to other data) while data is processed, for example. That is, pieces of data associated with each other may be integrated as one piece of data, or may be regarded as separate pieces of data. For example, information associated with coded data (an image) may be transmitted through a transmission path different from that of the coded data (image). Further, information associated with coded data (an image) may be recorded in a recording medium different from that for the coded data (image) (or in a different recording area of the same recording medium), for example. Note that "association" may apply to some of the data, instead of the entire data. For example, an image and the information corresponding to the image may be associated with each other for any appropriate unit, such as for a plurality of frames, each frame, or some portion in each frame.

Also, as described above, in this specification, the terms "to combine", "to multiplex", "to add", "to integrate", "to include", "to store", "to contain", "to incorporate, "to insert", and the like mean combining a plurality of objects into one, such as combining coded data and meta data into one piece of data, for example, and mean a method of the above described "association".

Further, embodiments of the present technology are not limited to the above described embodiments, and various modifications may be made to them without departing from the scope of the present technology.

For example, in this specification, a system means an assembly of a plurality of components (devices, modules (parts), and the like), and not all the components need to be provided in the same housing. In view of this, a plurality of devices that is housed in different housings and is connected to one another via a network form a system, and one device having a plurality of modules housed in one housing is also a system.

Furthermore, any configuration described above as one device (or one processing unit) may be divided into a plurality of devices (or processing units), for example. Conversely, any configuration described above as a plurality of devices (or processing units) may be combined into one device (or one processing unit). Furthermore, it is of course possible to add components other than those described above to the configuration of any of the devices (or processing units). Further, some components of a device (or processing unit) may be incorporated into the configuration of another device (or processing unit) as long as the configuration and the functions of the entire system remain substantially the same.

The present technology can also be embodied in a cloud computing configuration in which one function is shared among a plurality of devices via a network, and processing is performed by the devices cooperating with one another, for example.

Further, the above described program can be executed by any appropriate device, for example. In that case, any appropriate device should have necessary functions (function blocks and the like) so that necessary information can be obtained.

Meanwhile, the respective steps described with reference to the above described flowcharts can be carried out by one device or can be shared among a plurality of devices, for example. Furthermore, when a plurality of processes is included in one step, the plurality of processes included in the step can be performed by one device or can be shared among a plurality of devices.

Note that a program to be executed by a computer may be a program for performing the processes in the steps according to the program in chronological order in accordance with the sequence described in this specification, or may be a program for performing processes in parallel or performing a process when necessary, such as when there is a call. Further, the processes in the steps according to the program may be executed in parallel with the processes according to another program, or may be executed in combination with the processes according to another program.

Note that, as long as there is no inconsistency, the plurality of technologies described in this specification can be implemented independently of one another. It is of course also possible to implement a combination of some of the plurality of technologies. For example, the present technology described in one of the embodiments can be implemented in combination with the present technology described in another one of the embodiments. Further, any of the technologies described above can be implemented in combination with some other technology not described above.

Note that the present technology may also be embodied in the configurations described below.

(1) An image processing apparatus including:

a cost calculation unit that calculates costs of prediction modes of respective blocks constituting the current frame; and a refresh mode determination unit that selects prediction modes of the respective blocks, on the basis of the costs and refreshed blocks that are the blocks refreshed in a previous frame that is located before the current frame timewise.

(2) The image processing apparatus according to (1), in which the refreshed blocks are the blocks in which an image can be generated and reconstructed only with data of the previous frame.

(3) The image processing apparatus according to (1) or (2), in which, in the previous frame, the refreshed blocks are intra blocks that are the blocks on which intra prediction has been performed in the previous frame, or the blocks encoded as first inter blocks that are the blocks on which inter prediction referring to the refreshed blocks has been performed in the previous frame.

(4) The image processing apparatus according to (3), in which the refresh mode determination unit selects a prediction mode of blocks increased in number from the number of the refreshed blocks by a predetermined number among the blocks constituting the current frame, from between a mode of the intra prediction and a mode of the inter prediction referring to the refreshed blocks.

(5) The image processing apparatus according to (4), in which, when all the blocks of the previous frame have turned into the refreshed blocks, the number of the refreshed blocks is reset.

(6) The image processing apparatus according to (4) or (5), in which, among the blocks constituting the current frame, the refresh mode determination unit selects a prediction mode of the remaining blocks other than the blocks increased in number from the number of the refreshed blocks by the predetermined number, on the basis of the smallest cost among the costs of all prediction modes.

(7) The image processing apparatus according to (6), in which the remaining blocks are the blocks encoded as second inter blocks that are the blocks on which inter prediction referring to unrefreshed blocks has been performed in the previous frame, the unrefreshed blocks being the blocks that are not the refreshed blocks.

(8) The image processing apparatus according to any one of (1) to (7), in which the costs represent loads when encoding is performed block by block.

(9) The image processing apparatus according to any one of (1) to (8), in which the cost calculation unit calculates the costs from compression distortion and a generation amount.

(10) An image processing method for causing an image processing apparatus to:

calculate costs of prediction modes of respective blocks constituting the current frame; and select prediction modes of the respective blocks, on the basis of the costs and refreshed blocks that are the blocks refreshed in a previous frame that is located before the current frame timewise.

REFERENCE SIGNS LIST

11 Encoding device
24 Intra refresh mode determination unit
27 Entropy encoding unit
33 Intra prediction unit
34 Motion compensation unit
35 Selector
101 Decoding device

The invention claimed is:
1. An image processing apparatus, comprising:
a central processing unit (CPU) configured to:
calculate a plurality of costs of a plurality of prediction modes, wherein
each cost of the plurality of costs corresponds to a respective prediction mode of the plurality of prediction modes,
the plurality of costs of the plurality of prediction modes is calculated for each block of a plurality of blocks of a current frame,
the plurality of prediction modes includes an intra prediction mode and an inter prediction mode,
the plurality of blocks of the current frame includes a plurality of first unrefreshed blocks and a plurality of first refreshed blocks,
the plurality of first refreshed blocks is refreshed in a previous frame,
the plurality of first unrefreshed blocks is different from the plurality of first refreshed blocks, and
the current frame is subsequent to the previous frame;
select a first number of blocks of the plurality of blocks based on an ascending order of the plurality of costs, wherein the first number of blocks is greater than a second number of the plurality of first refreshed blocks; and
select a first prediction mode from the plurality of prediction modes for the first number of blocks, wherein
the first prediction mode is selected for the first number of blocks based on a set of costs of the plurality of costs, and
the set of costs corresponds to the first number of blocks.

2. The image processing apparatus according to claim 1, wherein the plurality of first refreshed blocks corresponds to blocks in which an image is each of generatable and reconstructable based on data of the previous frame.

3. The image processing apparatus according to claim 2, wherein
in the previous frame, the plurality of first refreshed blocks is one of:
a plurality of intra blocks on which an intra prediction process is executed in the previous frame, or
a plurality of first inter blocks on which an inter prediction process is executed in the previous frame, wherein the plurality of first inter blocks refers to a plurality of second refreshed blocks in the previous frame.

4. The image processing apparatus according to claim 3, wherein the first number of blocks includes the second number of the plurality of first refreshed blocks.

5. The image processing apparatus according to claim 4, wherein the second number of the plurality of first refreshed blocks is reset in a case where an entirety of a plurality of blocks of the previous frame corresponds to the plurality of first refreshed blocks.

6. The image processing apparatus according to claim 4, wherein
the CPU is further configured to select a second prediction mode of the plurality of prediction modes for a plurality of remaining blocks of the plurality of blocks of the current frame,
the second prediction mode is selected based on a smallest cost among the plurality of costs, and
the plurality of remaining blocks is different from the first number of blocks of the current frame.

7. The image processing apparatus according to claim 6, wherein
the plurality of remaining blocks is encoded as a plurality of second inter blocks on which the inter prediction process is executed in the previous frame,
the plurality of second inter blocks refers to a plurality of second unrefreshed blocks in the previous frame, and
the plurality of second unrefreshed blocks of the previous frame is different from the plurality of second refreshed blocks of the previous frame.

8. The image processing apparatus according to claim 1, wherein
the cost represents an encoding load, and
the encoding load is based on execution of a block by block encoding process of the current frame.

9. The image processing apparatus according to claim 8, wherein the CPU is further configured to calculate the plurality of costs based on a compression distortion of a respective block of the plurality of blocks of the current frame and a generation amount of the respective block.

10. An image processing method, comprising:
calculating a plurality of costs of a plurality of prediction modes, wherein each cost of the plurality of costs corresponds to a respective prediction mode of the plurality of prediction modes, the plurality of costs of the plurality of prediction modes is calculated for each block of a plurality of blocks of a current frame, the plurality of prediction modes includes an intra prediction mode and an inter prediction mode, the plurality of blocks of the current frame includes a plurality of unrefreshed blocks and a plurality of refreshed blocks, the plurality of refreshed blocks is refreshed in a previous frame, the plurality of unrefreshed blocks is different from the plurality of refreshed blocks, and the current frame is subsequent to the previous frame;

selecting a first number of blocks of the plurality of blocks based on an ascending order of the plurality of costs, wherein the first number of blocks is greater than a second number of the plurality of refreshed blocks; and selecting a prediction mode from the plurality of prediction modes for the first number of blocks, wherein the prediction mode is selected for the first number of blocks based on a set of costs of the plurality of costs, and the set of costs corresponds to the first number of blocks.

\* \* \* \* \*